United States Patent [19]
Tsuboi et al.

[11] Patent Number: 6,040,880
[45] Date of Patent: Mar. 21, 2000

[54] DISPLAY DEVICE

[75] Inventors: Takayuki Tsuboi, Yokohama; Mineto Yagyu, Sagamihara; Akihiko Nagano, Ichihara; Hiroshi Kikuchi, Zushi, all of Japan

[73] Assignee: Canon Kabushiki Kaisha, Tokyo, Japan

[21] Appl. No.: 08/987,895

[22] Filed: Dec. 10, 1997

[30] Foreign Application Priority Data

Dec. 16, 1996 [JP] Japan .................................. 8-335399
Jun. 30, 1997 [JP] Japan .................................. 9-174595
Jun. 30, 1997 [JP] Japan .................................. 9-174602

[51] Int. Cl.⁷ ........................................... G02F 1/1335
[52] U.S. Cl. .................... 349/5; 349/61; 349/68; 349/70
[58] Field of Search .................. 349/5, 8, 10, 61, 349/68, 70, 24, 25, 29, 67; 353/29, 89; 359/241, 242, 243, 244

[56] References Cited

U.S. PATENT DOCUMENTS

| | | | |
|---|---|---|---|
| 4,060,316 | 11/1977 | Pollack et al. | 353/20 |
| 4,908,876 | 3/1990 | DeForest et al. | 382/24 |
| 5,264,951 | 11/1993 | Takanashi et al. | 359/53 |
| 5,299,042 | 3/1994 | Takanashi et al. | 359/72 |
| 5,612,798 | 3/1997 | Tuli | 349/24 |
| 5,856,814 | 1/1999 | Yagyu | 345/89 |

*Primary Examiner*—Georgia Epps
*Assistant Examiner*—Margaret Burke
*Attorney, Agent, or Firm*—Robin, Blecker & Daley

[57] ABSTRACT

A display device includes a spatial light modulator capable of writing therein an image and capable of reading therefrom the written image by converting the image, and an illumination device which transmissively illuminates the spatial light modulator through respective different paths for writing the image and for reading the image.

17 Claims, 23 Drawing Sheets

FIG. 1
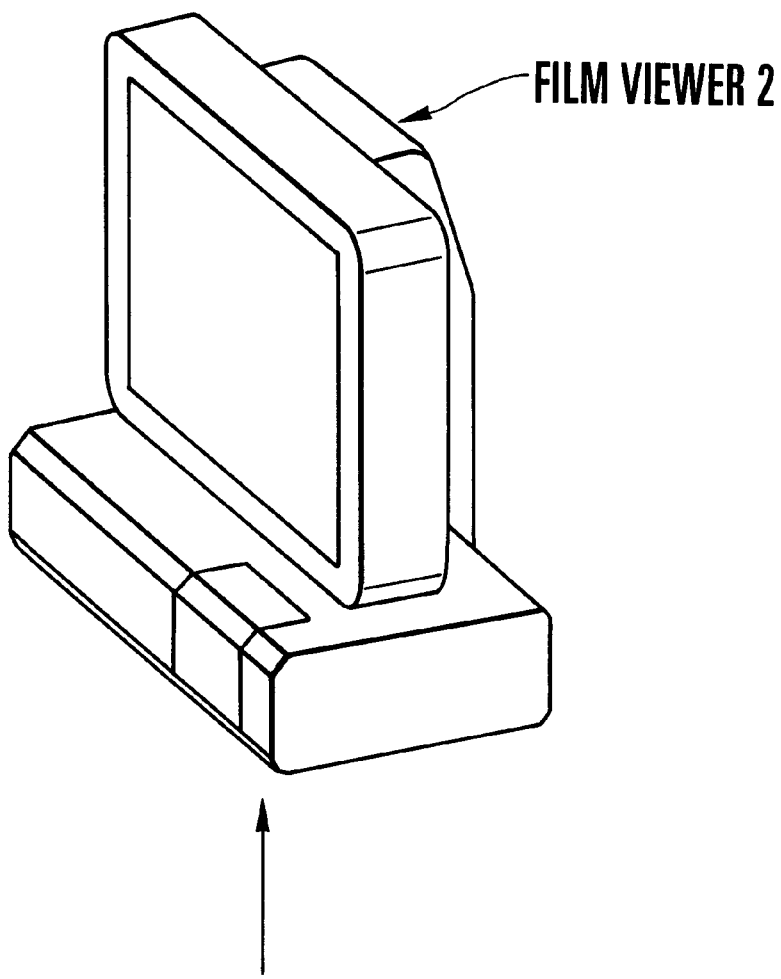
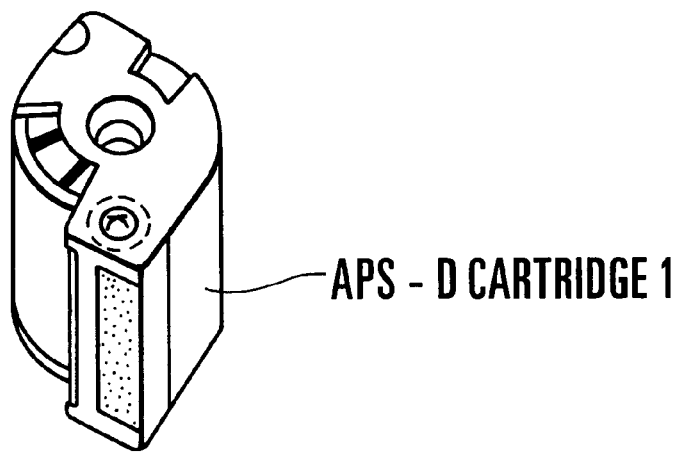

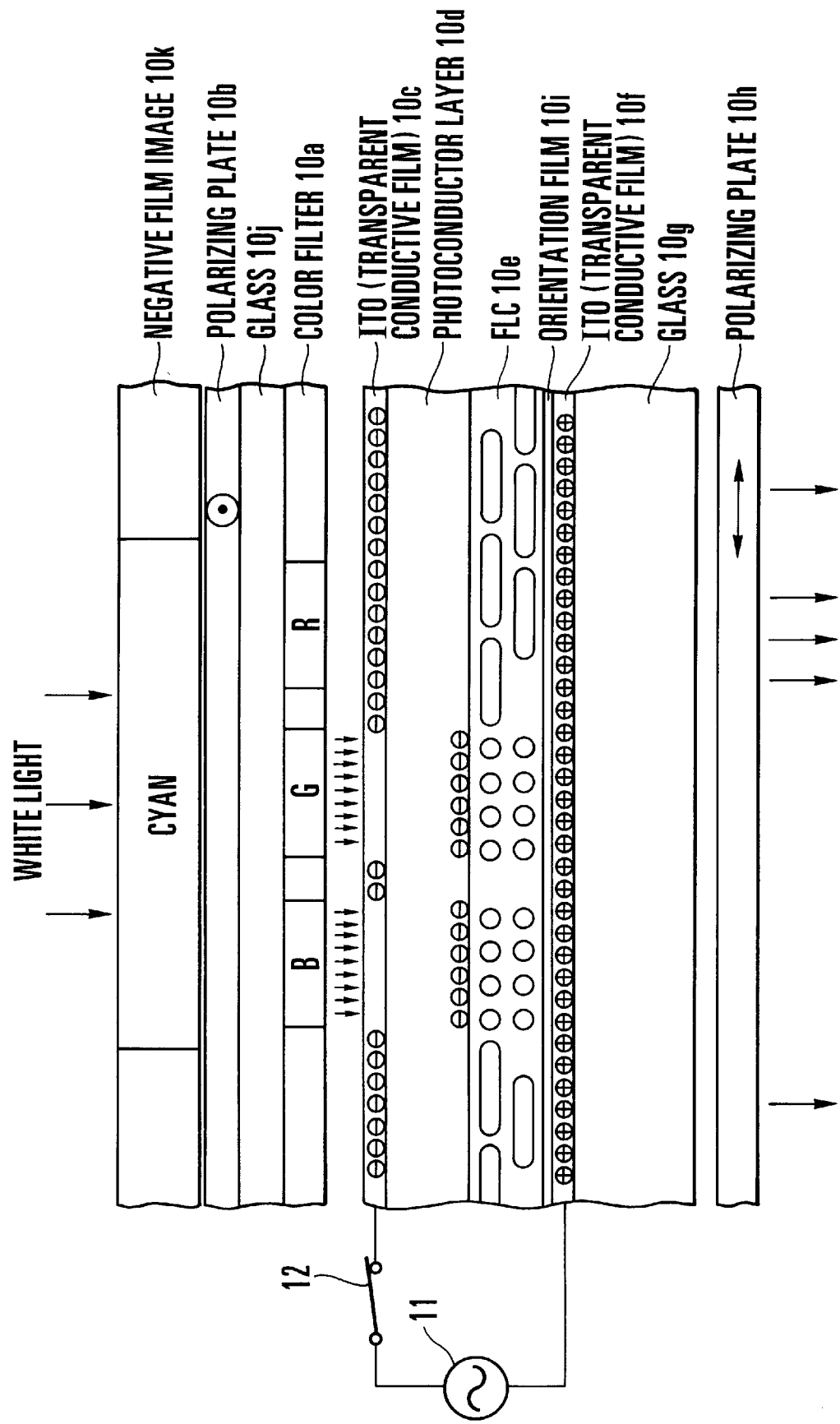

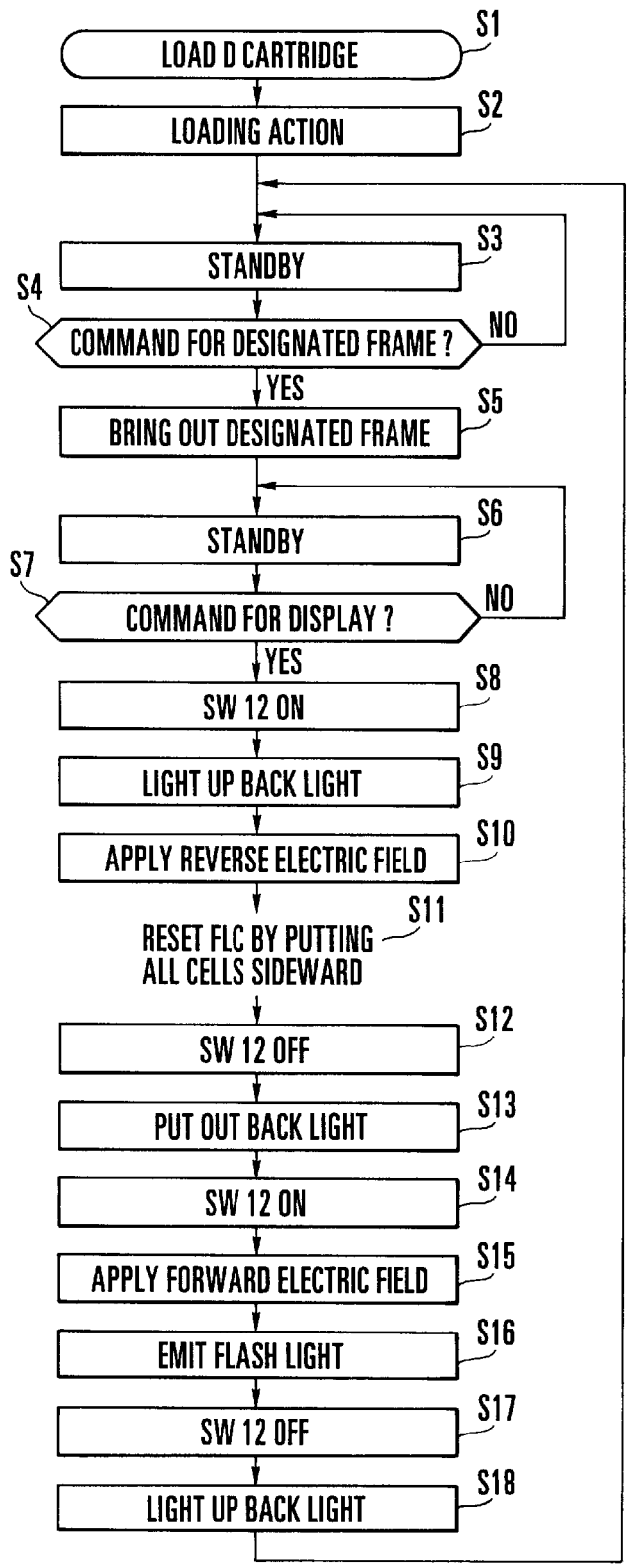

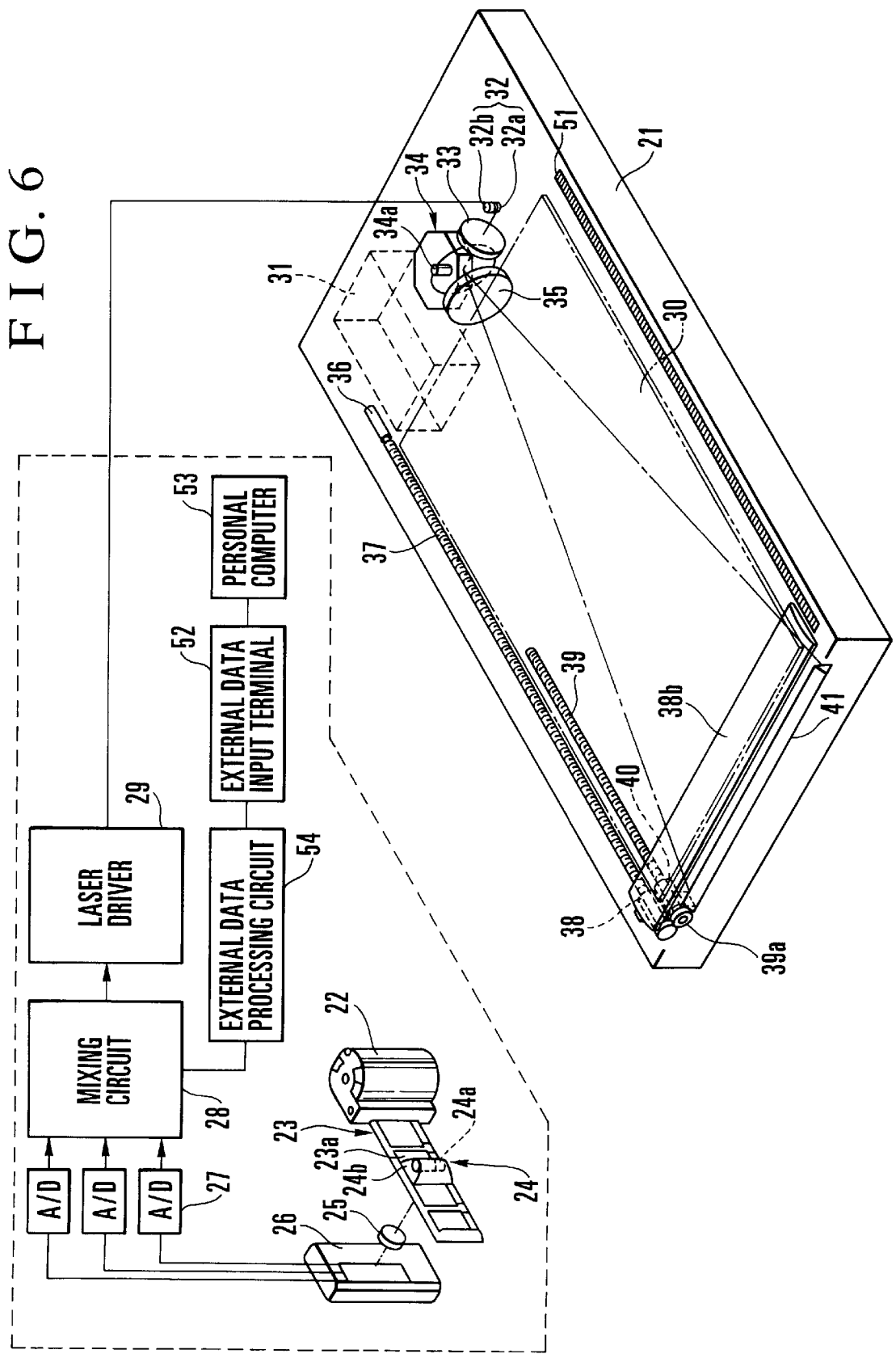

DISPLAY DEVICE

BACKGROUND OF THE INVENTION

1. Field of the Invention

The present invention relates to a display device capable of displaying an image recorded, for example, on a developed film.

2. Description of Related Art

Known display devices such as film viewers have been arranged in general to convert a negative image into an electrical signal by using a CCD (charge-coupled device) camera and, after that, to display an image carried by the electrical signal on a CRT (cathode ray tube) display or on a liquid crystal display. Some of the known display devices are arranged to optically project on a screen a positive image recorded on a positive film. The known display devices also include various electronic image display devices arranged to display motion pictures on a CRT display or on a liquid crystal display, for example, by changing still images from one over to another at a television rate.

Meanwhile, spatial light modulators (SLMs) have been developed for display devices which are capable of inputting, storing, reading and erasing two-dimensional signals. The spatial light modulators are either of a photo-address type arranged to have a light image signal as an input or an electric-address type arranged to have time-serial electric signals as an input. The photo-address type spatial light modulators include a liquid crystal spatial light modulator, which is composed of a liquid crystal layer arranged to modulate a light signal and a light transmission layer arranged to transmit writing light energy to the liquid crystal layer. In a case where the photo-address type spatial light modulator is used for a liquid crystal projector, for example, a light image is displayed on a small-sized CRT display. The liquid crystal spatial light modulator having the light transmission layer and the liquid crystal layer arranged one after another is provided over the whole surface of the small-sized CRT display. The light image of the CRT display is radiated to the surface of a photoconductor, such as a CdS (cadmium sulfide) member. The impedance of the photoconductor drops at its part illuminated with the light to cause a higher voltage to be applied thereto than other parts not illuminated with the light. As a result, voltages are applied to the liquid crystal according to a distribution of intensity of the input light image. The transmissive light quantity of the liquid crystal is thus caused to vary by a hybrid field effect thereof. The image obtained on the small-sized CRT display is displayed on a screen, with the quantity of light transmitted through the liquid crystal projected on the screen in an enlarged state. The light transmission layer of the liquid crystal spatial light modulator is selected from among photoconductive materials such as CdS, ZnSe, a-Si (amorphous silicon), etc., photo-refractive crystals such as BSO (bismuth silicon oxide), BGO (bismuth germanium oxide), TBO, etc., and compound semiconductors of the III-V group or the II-VI group. The light transmission layer must have a high degree of detection sensitivity, a high resolution and a quick response. For the converting function of the liquid crystal layer which is required to have a quick response and a high contrast-giving power, a material for the layer is selected from among a group of materials including a twisted nematic liquid crystal, an electro-optic crystal such as $LiNbO_3$ (lithium niobate), BSO, etc., or an organic non-optical crystal, etc. Spatial light modulators of high performance thus have been developed.

However, in the above-stated display device using a CCD camera, the density of picture elements of the CCD which is an image pickup device and that of a display are coarse. For example, the face of a person on display is hardly discernible. The display device of such a kind is thus not suited for displaying silver-halide photographs.

As for the display device using a positive film, the positive film itself has narrow latitude (exposure tolerance) for photographing and is not popularly used by people as it necessitates taking heed to photo-taking conditions. The positive films also necessitate a greater amount of time and labor than negative films in developing them and in printing some of frames after they are developed.

In a case where a negative film is used, it is necessary to take into consideration the question of quantity of light. A rate of light transmissible through developed negative films carrying images of ordinary scenes is less than 10% on the average. Projection of the image in an enlarged state needs an excessively large quantity of light and thus requires use of a large device. Therefore, it is difficult to prepare a compact and handy film viewer for negative films.

Further, all the display devices mentioned above are arranged mainly for showing moving images. Therefore, the number of picture elements used for them is extremely insufficient, in terms of resolution, for showing still images. There has been no electronic display device arranged to be capable of showing images with such a high quality that is well compared to the quality of a silver-halide print. A display device developed for a high-definition TV is close to such an electronic display device. Although the display device of that kind shows some improvement over a normal TV system in respect to the number of picture elements, its driving rate either still remains unchanged from an ordinary TV rate or at about 60 Hz which is only twice as much as the ordinary TV rate. Therefore, when a somewhat bright still image is displayed, the image on display shows some flickers to the human eye and is not adequately viewable.

BRIEF SUMMARY OF THE INVENTION

In accordance with an aspect of the invention, there is provided a display device which is capable of showing images with a high picture quality, wherein a transmissive illumination path for writing an image into a spatial light modulator is made different from a transmissive illumination path for reading out an image written in the spatial light modulator.

The above and other aspects and features of the invention will become apparent from the following detailed description of embodiments thereof taken in conjunction with the accompanying drawings.

BRIEF DESCRIPTION OF THE SEVERAL VIEWS OF THE DRAWING

FIG. 1 is a perspective view schematically showing the appearance of a display cartridge of APS (Advanced Photo System™) which is used as an image input medium and the appearance of a display device arranged according to the invention as a first embodiment thereof.

FIG. 4 is a sectional view showing the structural arrangement of an SLM (spatial light modulator) used for the display device according to the first embodiment.

FIG. 5 is a flow chart showing an operation of the display device according to the first embodiment.

FIG. 6 is a look-through view schematically showing the arrangement of a display device according to the invention as a second embodiment thereof.

DETAILED DESCRIPTION OF THE INVENTION

Hereinafter, preferred embodiments of the invention will be described in detail with reference to the drawings.
(First Embodiment)

FIGS. 1 to 4 show a display device arranged as a first embodiment of the invention. FIG. 1 is a perspective view schematically showing the appearance of the display device which is the first embodiment. Referring to FIG. 1, the illustration includes a film viewer 2 which serves as the display device, and a cartridge 1 which contains therein a developed film of Advanced Photo System™ (APS) (hereinafter referred to as the D cartridge). With the D cartridge 1 loaded in the film viewer 2, pictures taken and recorded on the film are negative-to-positive inverted (inverted from a negative image to a positive image) and are displayed as high-definition images one after another on the film viewer 2. The film viewer 2 is arranged to be used, so to speak, as an electronic album by a photographer, for example, on a table or the like for viewing pictures taken by the photographer.

Figure 2:
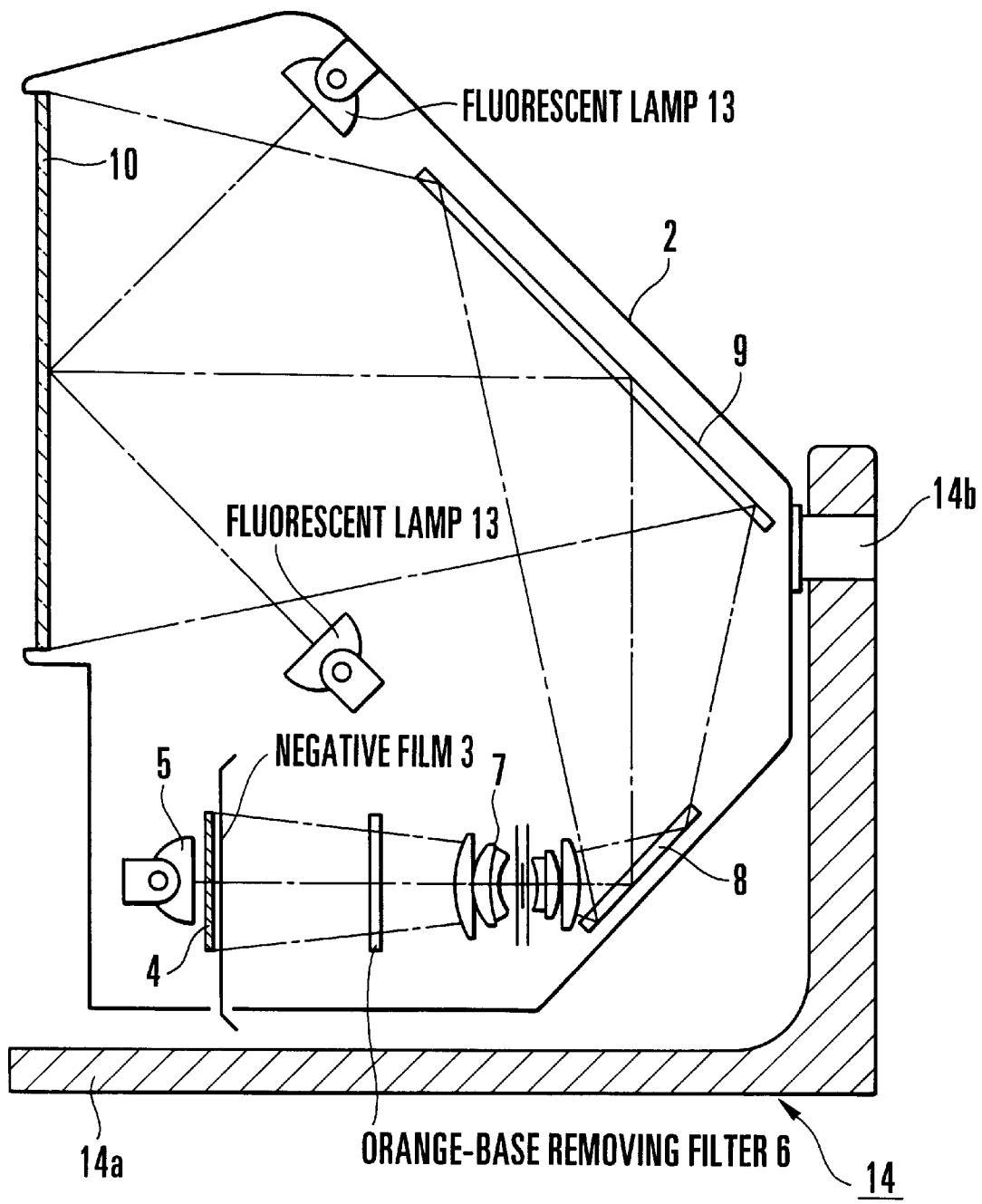
FIG. 2 is a sectional view of the display device according to the first embodiment.
Figure 3:
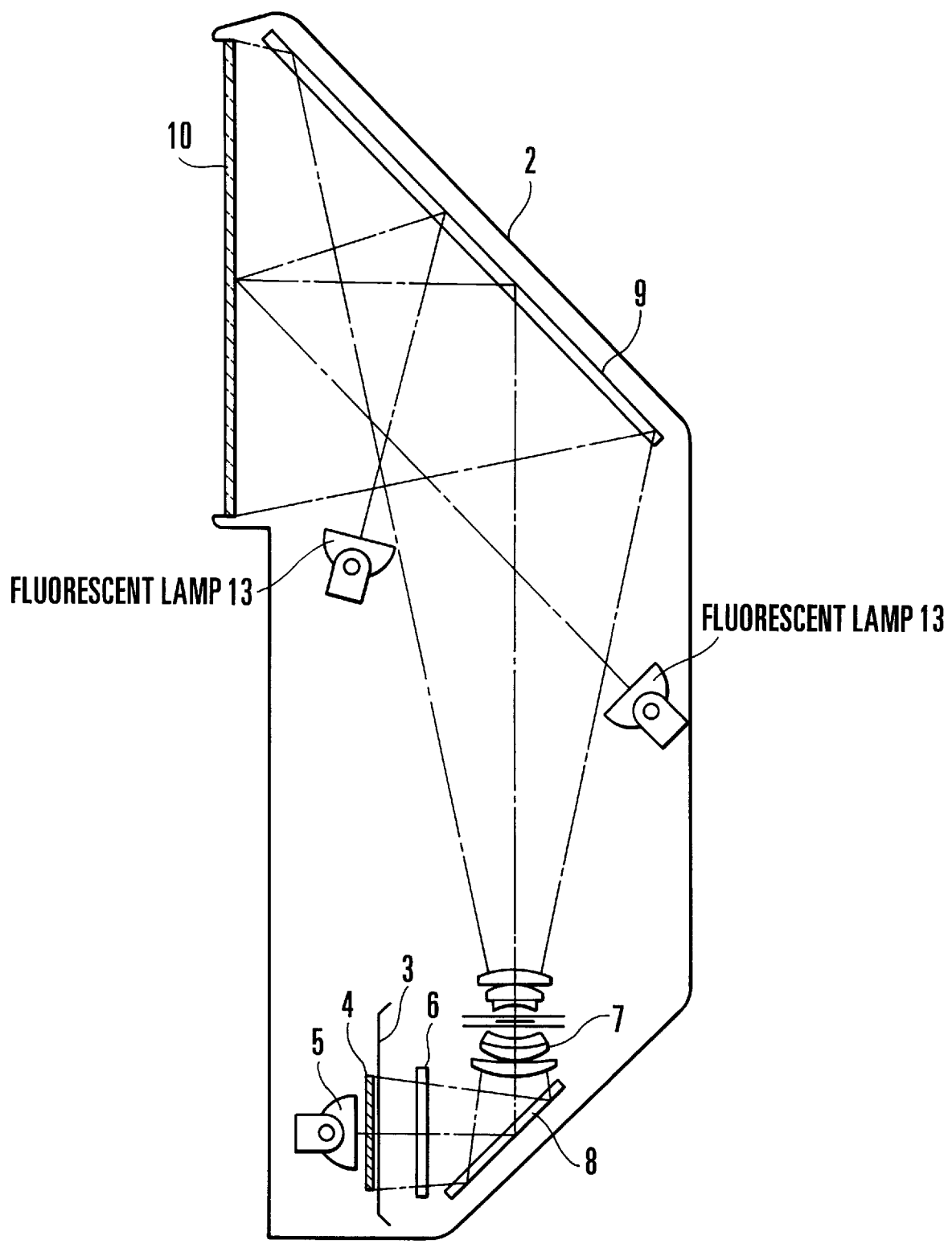
FIG. 3 is a sectional view of a modification of the display device according to the first embodiment.

FIG. 2 shows the internal structure of the film viewer 2 serving as a display device. FIG. 3 shows the arrangement of an optical system in the film viewer 2 modified to be adapted for the display device shown in FIG. 1.

In the structural arrangement shown in FIGS. 2 and 3, reference numeral 3 denotes a developed negative film which is pulled out from the D cartridge 1 and on which pictures taken by the photographer are recorded. A known film winding mechanism (not shown) is arranged to send the film out from the D cartridge 1 to bring one frame of the film to a position shown in FIG. 2 at a time. A diffusing plate 4 which is in a milky white color is arranged to uniformly diffuse light emitted from a flash unit 5 so as to illuminate the negative film 3. The flash unit 5 is composed of a xenon lamp or a metal halide lamp, a reflection shade, a light emission circuit, etc., and is arranged to emit light in response to a trigger signal from a system IC which will be described later herein. An orange-base removing filter 6 is an optical filter which is in a blue color complemental to an orange color and is arranged to remove an orange-base color from images recorded on the negative film 3.

A projection lens 7 is composed of an optical system of a gaussian type which causes less distortion than other types. In the case of the first embodiment, the projection lens 7 projects a negative film image onto a photoconductor layer of an SLM (spatial light modulator) 10 at a rate of about four magnifications. Reflection mirrors 8 and 9 are arranged to reflect the image projected by the projection lens 7 to be guided to the photoconductor layer of the SLM 10.

The operating principle of the SLM (spatial light modulator) 10 which is shown in FIG. 4 is described in detail as follows. Referring to FIG. 4, a color filter 10a is a color filter of pure colors R, G and B or complementary colors Y, C, M and K. The color filter 10a may be arranged to be in tight contact with an ITO (indium tin oxide) 10c. For example, a filter of fine mesh used for an image sensor CCD in a video camera or the like is preferably employed in the display device as the filter of such a type to permit viewing a silver-halide image without deteriorating the image. A liquid crystal layer 10e which will be described later is sandwiched between polarizing plates 10b and 10h. In the structure shown in FIG. 4, the polarization direction of the polarizing plate 10b is in rearward and frontward directions with respect to the paper surface of the drawing and that of the polarizing plate 10h is in the lateral directions with respect to the paper surface. The polarizing plates 10b and 10h are thus in a so-called cross Nicols structure. Transparent conductive ITO films 10c and 10f are normally made of indium oxide or the like and arranged to have potentials of different polarities brought forth between them by an AC power supply 11 and a switch 12 provided for driving the AC power supply 11. A photoconductor layer 10d forms a photodiode layer which is made of an amorphous film or an OPC (organic photoconductor). One side of the photoconductor layer 10d is in tight contact with the ITO film 10c mentioned above while the other side is in tight contact with the liquid crystal (FLC) layer 10e.

The liquid crystal layer 10e is composed of a ferroelectric liquid crystal, which is abbreviated to FLC. One side of the FLC layer 10e is in tight contact with the photoconductor layer 10d as mentioned above. The other side of the FLC layer 10e is in tight contact with an orientation film 10i which defines the orientation of the molecules of the FLC. The orienting direction of the orientation film 10i is arranged to be such that areas of the SLM where light reaches the OPC film are set in a light blocking state while areas where light does not reach the OPC film are set in a light transmissive state. The FLC having a quick response can be selected from among many liquid crystals for the first embodiment.

A glass layer (plate) 10g is arranged to seal the liquid crystal layer 10e in conjunction with another glass layer 10j which is disposed above the color filter 10a. These glass layers 10g and 10j are protecting other layers. A negative film image 10k is shown close to the SLM 10 for the sake of illustration of a virtual image of picture elements on the negative films 3 projected by the projection lens 7 as mentioned in the foregoing.

Referring again to FIGS. 2 and 3, each of illumination units (fluorescent lamps) 13 is of a straight tube type which is popularly used in an illumination unit for a flat display. A base seat 14 which is shown only in FIG. 2 supports the film viewer 2. The base seat 14 is composed of a support part 14a and a rotation shaft part 14b which is provided for allowing the film viewer 2 to be turned 90 degrees in viewing a picture taken in a vertical shooting posture.

FIG. 5 shows a flow of operation of the display device arranged according to the first embodiment of the invention as described above. The operation of the display device is described with reference to FIG. 5 as follows. First, the D (developed film) cartridge 1 is loaded on the film viewer 2 by the operator for the purpose of viewing images recorded on the developed film which is contained in the D cartridge 1. At a step S1, the film viewer 2 detects the loading of the D cartridge 1 in accordance with a designating action of a microcomputer included in a known control circuit. At a step S2, a thrusting action is performed to send the developed film out from inside of the D cartridge 1. The film sending out action comes to a stop when the first frame portion of the film is positioned at an aperture part of the film viewer 2.

At a step S3, the flow of operation proceeds to a state of waiting for receipt of a signal from a switch on an operation board which is not shown. At a step S4, a check is made to find if a signal which comes from, for example, a remote controller or the like is for bringing out a designated frame portion of the film. If so, the flow proceeds to a step S5. The film is transported by a known film winding mechanism forward to the designated frame position. When the designated frame is brought to the aperture part (which corresponds to the position of the negative film 3 as shown in FIG. 2) of the film viewer 2, the flow proceeds to a step S6. At the step S6 and the next step S7, the flow waits for receipt of a command as to whether or not the frame is to be displayed.

When a display command is received from the operator at the step S7, the flow proceeds to a step S8 to reset the picture of any frame that was previously displayed. At the step S8, a switch 12 is turned on to apply power of the AC power supply 11 to the parts of the SLM 10 between the ITO films 10c and 10f. After that, the flow proceeds to a step S9 to light up the illumination units 13 for back light. At a step S10, a reverse electric field is applied from the AC power supply 11 to the parts between the ITO films 10c and 10f.

At a step S11, the above-stated action causes all cells of the liquid crystal (FLC) layer 10e to be reset into a sideward inverted state as partly shown in FIG. 4. The reset action is carried on for a period of time long enough to reset all cells to the above-stated state. After the lapse of this period of time, the flow proceeds to a step S12. At the step S12, the switch 12 is turned off. At a step S13, the illumination units 13 for back light are put out. The flow shifts to a writing action for a new image, which begins at the step S13.

The film viewer 2 is assumed to be currently in a state of, for example, being placed on an office desk or on a shelf at a wall of a house in an environment having brightness of about several hundreds luxes. The external light from such an environment is reduced nearly by half through one polarizing plate 10h and the liquid crystal layer 10e before it falls on the photoconductor layer 10d. However, since the switch 12 is currently open, no electric field is applied to the parts between the ITO films 10c and 10f and the liquid crystal (FLC) layer 10e is not reacting.

At a step S14, the switch 12 is turned on. At a step S15, a forward electric field is applied to the parts between the ITO films 10c and 10f. At a step S16, the flash unit 5 is caused to emit flash light to have the image on the negative film 3 projected onto the SLM 10 through the projection lens 7 and the reflection mirrors 8 and 9. The image on the negative film 3 is thus written into the SLM 10 by transmissive illumination. This image projecting action is performed under a condition of having an incident external light as mentioned above. In view of such a condition, the action must be promptly carried out with the projection light having a prescribed S/N ratio. Fortunately the light emission by the flash unit 5 at the step S16 is carried out in 500 μsec or thereabout. Therefore, the step S14 of turning on the switch 12 is carried out at about the same timing and for about the same length of time as the flash light emission timing. Then, at a step S17, the switch 12 is turned off to promptly cut off the application of electric field. After that, at a step S18, the image written into the SLM 10 can be viewed by the operator of the display device as an image displayed on the SLM 10 (reading of the SLM image) in a state of being transmissively illuminated by lighting up the illumination units 13 for back light.

According to the result of a typical example of computing the quantity of light incident on the SLM 10, the luminance of such a compact flash unit 5 that can be mounted on the present display device is at least two thousand million $cd/m^2$. With the lens and other parts typically arranged, an incident light quantity of about 5000 luxes reaches the photoconductor layer 10d of the SLM 10.

After the step S18, the flow of operation returns to the step S3, at which the film viewer 2 waits for the next command. Meanwhile, owing to the memory characteristic of the liquid crystal layer 10e, the display image set on the SLM 10 by the above-stated action continues being displayed to be viewable by the operator.

In the flow chart of FIG. 5 described above, the electric field is applied to the parts between the ITO films 10c and 10f of the SLM 10 at the step S15. An image recorded on the negative film 3 is projected with an intense light through the color filter 10a (optical image) at the step S16. The impedance of the photoconductor layer 10d varies according to the quantity of the light. The electric field applied to the liquid crystal layer 10e varies according to the value of the impedance. Then, since the angle of twist of the liquid crystal layer 10e (converted image) varies according to the electric field applied, there is obtained a spatial-light-modulated state. Even after the switch 12 is turned off, the degree of the angle of twist remains unchanged by virtue of the memory characteristic of the liquid crystal (FLC) layer 10e. Therefore, with the back light illumination units 13 lighted up, an image corresponding to the image recorded on the negative film 3 can be continuously displayed.

(Second Embodiment)

FIGS. 6 to 11 relate to a display device arranged as a second embodiment of the invention. FIG. 6 shows, in a partly look-through stereoscopic perspective view, the body of the display device 21 according to the second embodiment. The display device 21 is in a flat shape. A prism 41 is arranged below a spatial light modulator (SLM) 30 to be movable over the whole surface of the SLM 30 by a mechanical scanning means 37. A light flux of a laser 32 which is modulated with an image signal is applied to the prism 41 by the rotation of a polygonal mirror 34 so as to scan the prism 41 accordingly as the prism 41 is moved by the mechanical scanning means 37. Thus, the light flux of the laser 32 causes an image to be written into the SLM 30 with transmitted light.

Referring to FIG. 6, in the display device 21, a scanner unit 31 is arranged to have a film cartridge 22 which contains therein a film 23 having developed pictures set in a cartridge chamber (not shown). The developed film 23 is arranged to be moved out of the cartridge 22 by a known film transport mechanism. A frame 23a designated by the operator is thus sent out in the optical path of a line CCD 26 which will be described later.

An illumination light source 24 is normally composed of a three-wavelength tube 24a which has the wavelengths of colors R, G and B in a firmly balanced state within a fluorescent tube, a reflection shade 24b and a diffusing plate which is not shown in FIG. 6. The illumination light source 24 is disposed in a position located close to the film 23. The frames of the film 23 are transported to this position one after another by the film transport mechanism.

A projection lens 25 is arranged to project the image of the film frame 23a on the line CCD 26 in a reduced size. The projection lens 25 includes therein a diaphragm device which is arranged to be used for automatic focusing and exposure adjustment.

The line CCD 26 is composed of three lines of colors R, G and B. Each of the three lines has a color filter of an applicable color disposed in front of it. Information on the luminance of each color is outputted from each applicable line by a shift register to an A/D converter 27. The A/D converter 27 then converts the luminance information into digital information data. The data is supplied to a laser driver 29 through a mixing circuit 28. The output of the laser driver 29 is sent to the semiconductor laser 32 to drive the semiconductor laser 32.

An external data input terminal 52 is arranged to receive image data of a CD-ROM or the like coming from outside through a personal computer 53. With known digital image data, such as image data of JPEG, MPEG or the like, taken into the display device through the input terminal 52, an external data processing circuit 54 processes the data into image data apposite to the SLM 30. The data thus processed also can be written into the SLM 30 by driving the semiconductor laser 32. The images stored in the CD-ROM or the like is thus converted into data viewable by the display device and is supplied to the mixing circuit 28.

Figure 7A:
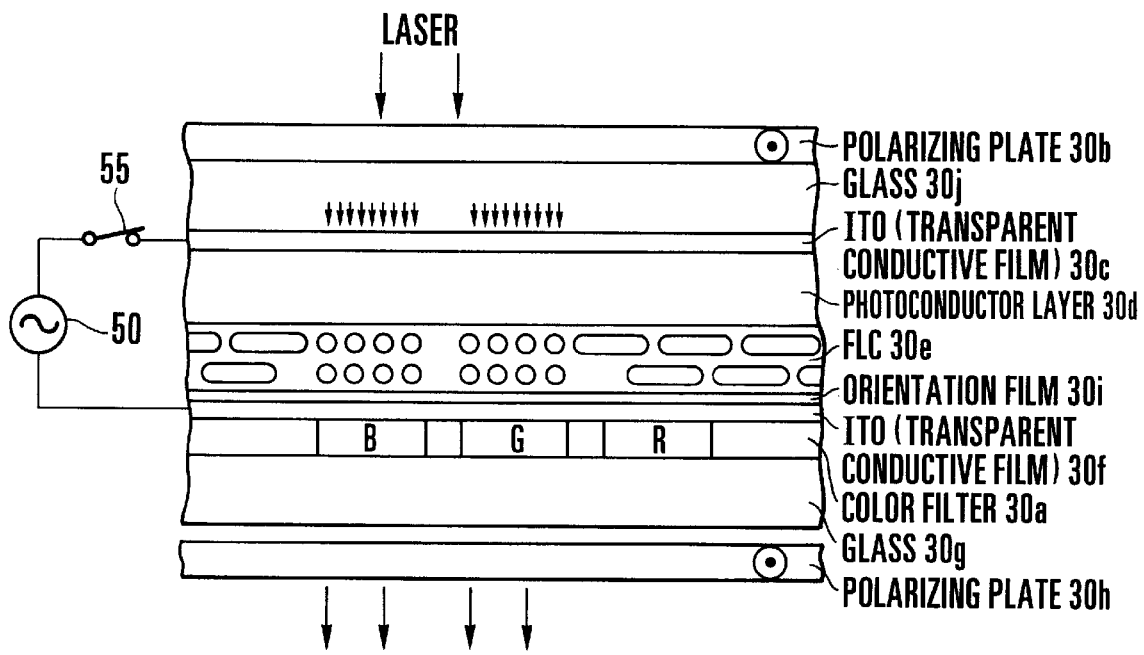
FIGS. 7(a) and 7(b) are sectional views showing the structural arrangement of an SLM used for the display device according to the second embodiment.
Figure 7B:
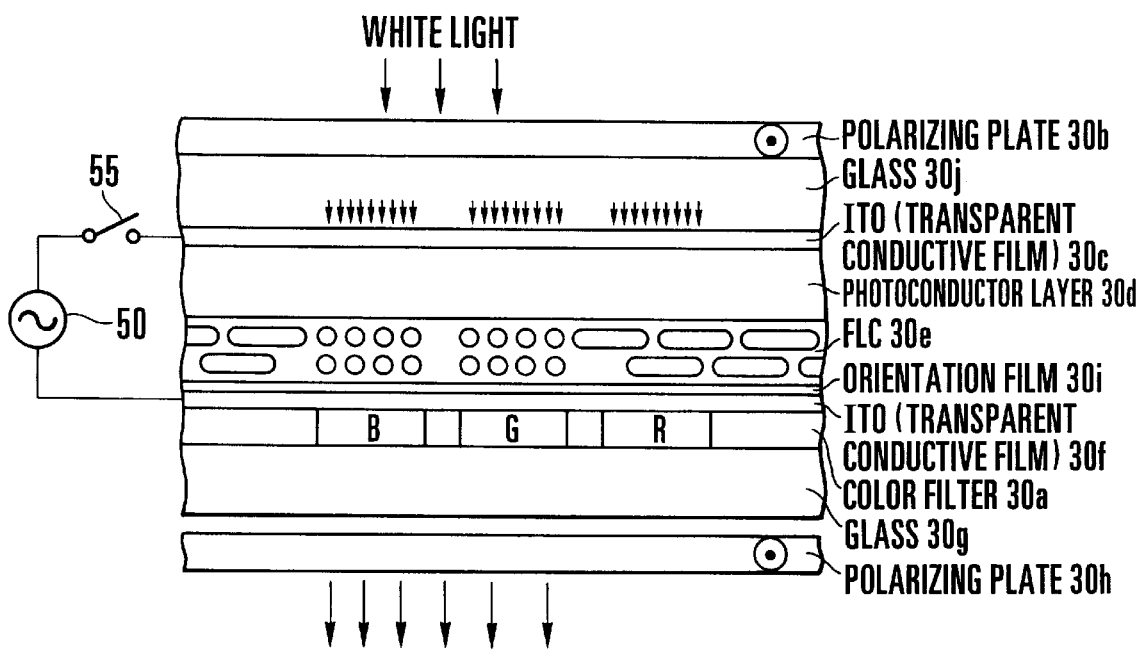

The SLM 30 includes an FLC and is arranged as shown in detail in FIGS. 7(a) and 7(b). The SLM 30 includes no segment pattern having a memory function. An image recorded on the film and read by the scanner unit 31 is written into the SLM 30 as a high quality picture by means of the semiconductor laser 32 through some filters and computing parts. The image thus written into the SLM 30 is illuminated with back light and is made viewable for the operator in accordance with procedures set forth in a flow chart as will be described later. FIG. 7(a) shows the SLM 30 in a state of being illuminated with the semiconductor laser 32 in writing the image into the SLM 30. FIG. 7(b) shows the SLM 30 in a state of being illuminated with a back light 43 (FIG. 8) after completion of the writing process.

In the SLM 30, a polarizing plate 30h is arranged to cover the whole upper surface of the SLM 30 as viewed in FIG. 6, and, below the polarizing plate 30h, a glass plate (layer) 30g is also arranged over the whole surface of the SLM 30. An ITO film 30c is formed in a stripe-like pattern all over the surface of the SLM 30. Each part of the stripe-like pattern of the ITO film 30c is provided with a transistor which is in a thin film shape and serves as a switch. The electric field of each pattern part is thus arranged to be controllable independently of other pattern parts.

The details of the SLM 30 are described as follows. Referring to FIGS. 7(a) and 7(b) which show the principle of the SLM 30, a color filter 30a is either for pure colors or for complementary colors. For example, a fine mesh filter generally used for the image pickup CCD in a video camera is preferably used as the color filter 30a because it makes a silver-halide image viewable without deteriorating the image. Polarizing plates 30b and 30h are disposed across a liquid crystal layer 30e. In the case of the structural arrangement shown in FIGS. 7(a) and 7(b), both the polarizing plates 30b and 30h are in a so-called parallel Nicols structure and are both arranged to have their polarizing directions frontward and rearward with respect to the paper surface of the drawing. ITO films 30c and 30f are transparent photo-conductive films normally made of indium oxide or the like. Each of the ITO films 30c and 30f is arranged to have potentials of different polarities brought forth in its transparent conductive film by an AC power supply 50 and a switch 55 provided for driving the AC power supply 50.

In FIGS. 7(a) and 7(b), the transparent electrodes of the ITO film 30c are formed independently of each other in an electrode pattern on stripes arranged at a very fine pitch in the vertical direction as viewed in the drawing (in the direction of scanning by a polygonal mirror which will be described later herein). Each part of the electrode pattern forms a known transistor switch and is arranged to be controllable independently of other parts for supply of power.

A photoconductor layer 30d is arranged to form a photodiode layer with an amorphous film, an OPC (organic photoconductor) film or the like. One side of the photoconductor layer 30d is in tight contact with the above-stated ITO film 30c. The other side of the photoconductor layer 30d is in tight contact with the liquid crystal layer 30e. The liquid crystal layer 30e is made of FLC (ferroelectric liquid crystal) and may be formed with any of liquid crystals of varied kinds. As mentioned above, the liquid crystal layer 30e is in tight contact with the photoconductor layer 30d on its one side and with an orientation film 30i on the other side. The glass layer 30g is arranged to seal the liquid crystal layer 30e in conjunction with another glass layer 30j which is disposed above the color filter 30a. These glass layers 30g and 30j are protecting other layers.

The glass layer 30g and the polarizing plate 30h have anti-reflection coating films applied to the surfaces of them. The anti-reflection coating prevents any intense external light existing outside of the light blocking area of a light blocking plate 38b (FIG. 6) from being totally reflected inside of a medium to come round to lower the S/N ratio of an image writing action which is performed with the semiconductor laser 32.

The semiconductor laser 32 is a near infrared laser including an erasing laser 32a which is arranged to erase an old image previously written in the SLM 30 and a writing laser 32b which is arranged to write image data newly sent from the film scanner unit 31.

It is preferable, in respect of the makeup of products, to erase a previously written image in the SLM 30 immediately before newly writing an image. In view of this, the so-called "wipe switching" process for erasing and writing can be provided to the operator. More specifically, in carrying out this process, the electric fields of ITO lines which are several to scores of ITO lines before forming a newly writing image are applied reversely to image writing, and the infrared light of the erasing laser 32a is applied in a DC-like manner to bring about a uniform liquid crystal state necessary before writing, as shown by a laterally long shape of the cells of liquid crystal (FLC) layer 30e in FIGS. 7(a) and 7(b).

Therefore, in order to simultaneously carry out the erasing action and the writing action with different semiconductor lasers as in the second embodiment, it is necessary to apply voltages to the patternized ITO films 30c and 30f in the following manner. Assuming that the voltage on a non-patternized side (common side) of the ITO film is 0 V, two positive and negative potentials must be applied with respect to a common potential. For example, −30 V is applied on the erasing side and +30 V is applied on the writing side.

In this instance, an electric field is generated also between the potentials of +30 V and −30 V in parallel with the liquid crystal layer. However, the image writing and erasing actions can be prevented from being affected by this electric field, for improvement in the S/N ratio of images, by writing and erasing images not between directly adjoining pattern parts but between pattern parts located a predetermined distance away from each other.

Further, since the image erasing and writing actions are performed within an inner part of the device shielded from external light by the light blocking plate 38b, these actions appear to the operator as change-over from one image to another before and after a passing motion of the light blocking plate 38b.

A first convex lens unit 33 is arranged to form the image of the (semiconductor) laser 32 approximately on the polygonal faces of the polygonal mirror 34. The polygonal mirror 34 is in a shape having an octagonal mirror face and has its shaft 34a rotatably supported by a support mechanism.

Figure 8:
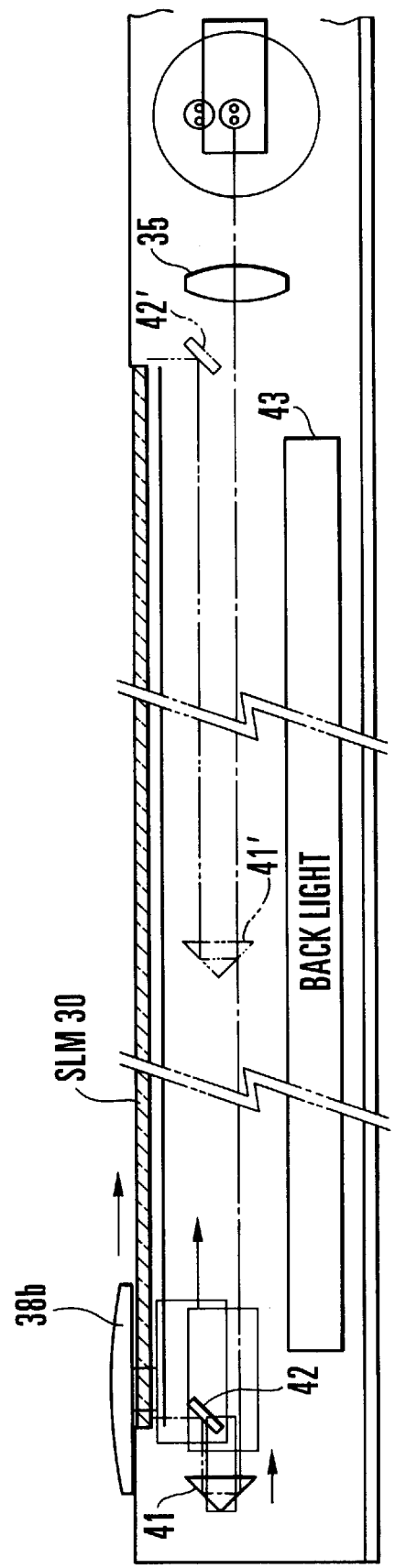
FIG. 8 is a sectional view of the display device according to the second embodiment.

A projection lens 35 is arranged to project an image coming from the polygonal mirror 34 on the SLM 30. Referring to FIG. 8 which is a side view, the projection lens 35 causes the image of the laser 32 to be formed on the photoconductor layer 30d of the SLM 30 through an optical path defined by the total reflection prism 41 and a reflection mirror 42.

A stepping motor 36 is arranged to transmit the output of its output shaft to a helicoidal screw shaft 37 to cause the screw shaft 37 to rotate. The rotation of the screw shaft 37 causes a female helicoid screw 38 which is in mesh with the screw shaft 37 to move the light blocking plate 38 through a groove (not shown). The light blocking plate 38b which is formed integrally with the female screw 38 is thus moved to the right or left as viewed in FIG. 8.

The light blocking plate 38b is provided for improvement in the S/N ratio of the images to be written in and is arranged to prevent external light from coming round through the color filter 30a and the liquid crystal layer 30e of the SLM 30 to enter the photoconductor layer 30d to which the electric field is applied.

Figure 9:
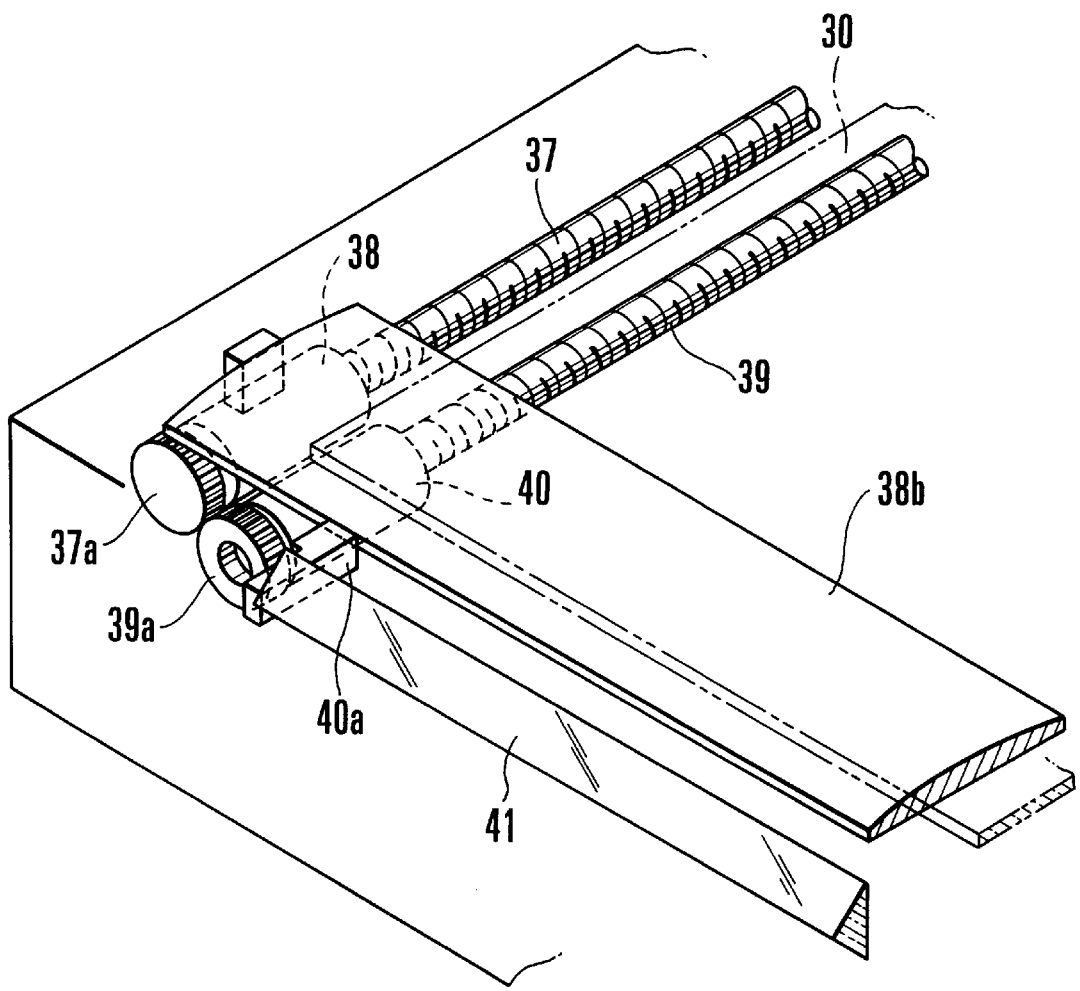
FIG. 9 is an enlarged perspective view showing in part the display device according to the second embodiment.

Referring to FIG. 9, the helicoidal screw shaft 37 has a connection gear 37a formed coaxially therewith. The connection gear 37a is in mesh with a gear part 39a of a second helicoidal screw shaft 39 and is arranged to transmit the power of the stepping motor 36 to the second helicoidal screw shaft 39. The second helicoidal screw shaft 39 is rotatably supported by the body of the device through a guide member which is not shown. A second female helicoid 40 is in screwed connection with the helicoid part of the second helicoidal screw shaft 39. When the above-stated stepping motor 36 rotates, the rotation is transmitted to the second helicoidal screw shaft 39 through the gear parts 37a and 39a to cause the second female helicoid 40 to move to the right or left as viewed in the drawing.

Further, in the second embodiment, the screw lead of the helicoidal screw shaft 37 and that of the second helicoidal screw shaft 39 are in the ratio of 2:1. The second female helicoid 40 is thus arranged to move just one half of the stroke of the female helicoid 38. By virtue of this arrangement, the length of the optical path of the laser 32, from the lens 35 which is provided for forming an image on the SLM 30 to the SLM 30, remains almost unvarying wherever the writing part is located on the SLM 30.

The second female helicoid 40 is provided with a prism supporting part 40a for supporting the triangular prism 41. As shown in FIG. 8, the triangular prism 41 is arranged to have a laser light from the semiconductor laser 32 to fall thereon through the polygonal mirror 34 and the image forming lens 35. The laser light is then reflected twice to change its direction 180 degrees to fall on a reflection mirror 42. The direction of the laser light incident on the reflection mirror 42 is further changed 90 degrees, so that the laser light is imaged on the photoconductor layer 30d of the SLM 30.

A detection pattern 51 is arranged to output position information on the stripe-shaped ITO film 30c of the SLM 30 in the form of a pulse pattern. The pulse pattern of the detection pattern 51 is detected by a known photo-sensor to find the incident positions of the laser light of the semiconductor lasers 32a and 32b. The illuminating positions of the semiconductor lasers 32a and 32b are thus accurately detected by virtue of this arrangement. Then, according to the result of detection, the switching timing for each stripe of the stripe-like pattern of the ITO film 30c is controlled in applying electric fields respectively on the erasing and writing sides.

Further, the reflection mirror 42 is supported by a support part (not shown) of the female helicoid 38 and is arranged to move integrally with the female helicoid 38.

Such being the arrangement, a distance from the image forming lens 35 to the photoconductor layer 30d of the SLM 30 remains unchanged even when the pair of the triangular prism 41 and the reflection mirror 42 and the light blocking plate 38b are respectively moved to their positions 41' and 42' by the rotating force of the stepping motor 36.

The back light 43 is composed of a light source made of a three-wavelength fluorescent tube, etc., a known reflective light guiding plate, etc. As shown in flow charts described below, with an image written in the SLM 30, at the time of viewing the image written in the SLM 30 by turning off the electric field, the back light 43 is lighted up to let the operator view the image under adequate transmissive illumination of back light.

The display device 21 having the above construction operates as described below with reference to FIGS. 10 and 11 which are flow charts.

Figure 10:
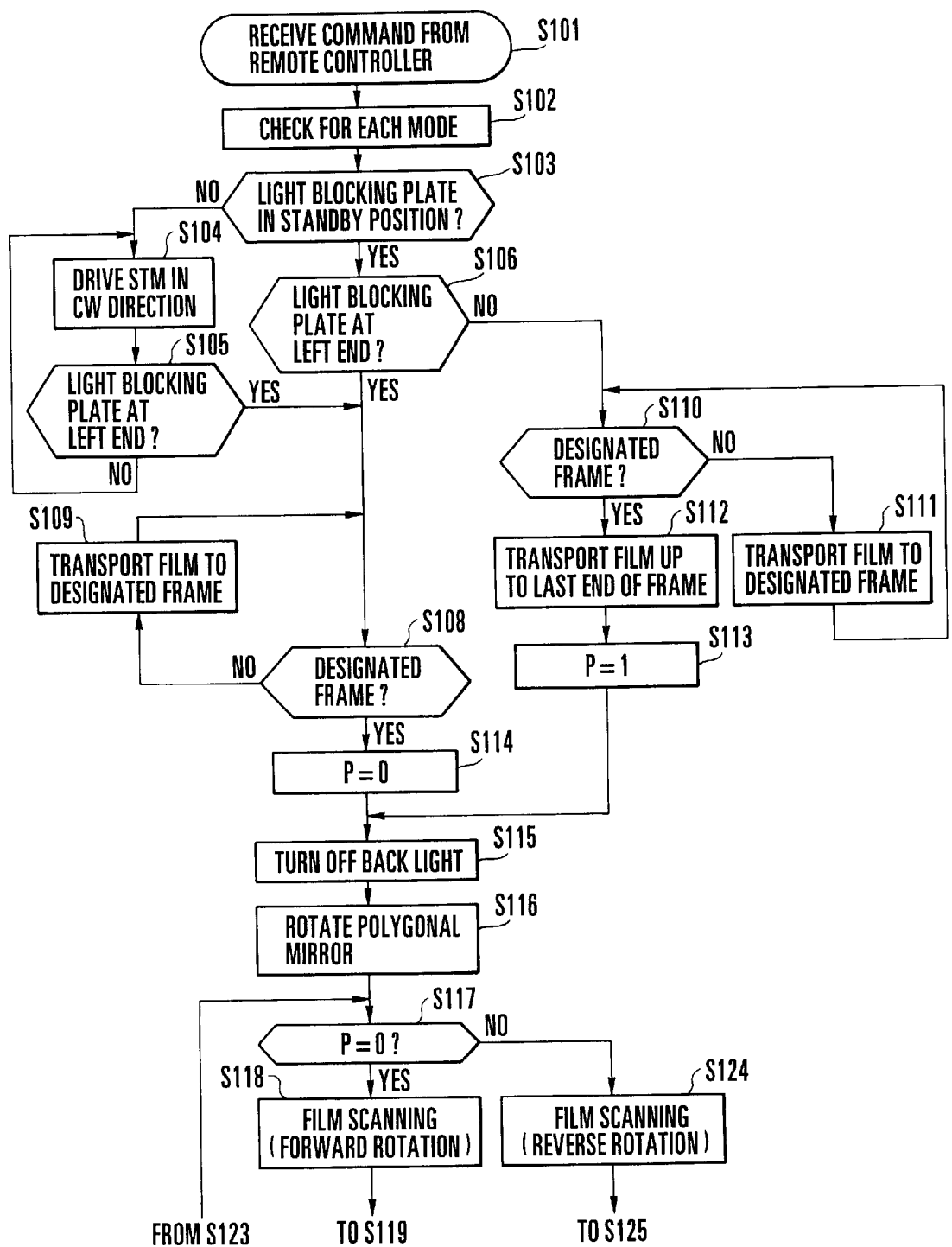
FIG. 10 is a flow chart showing an operation of the display device according to the second embodiment.
Figure 11:
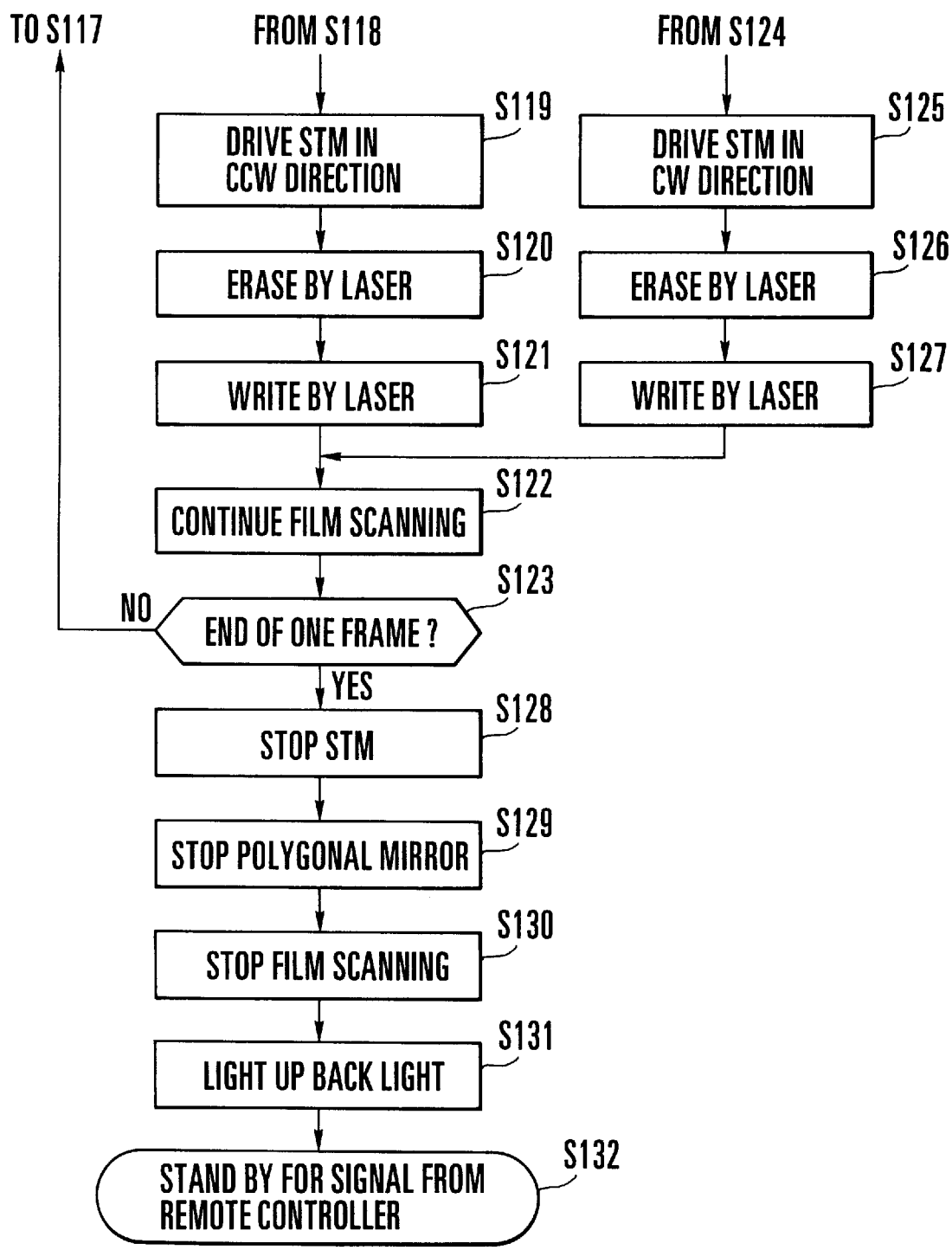
FIG. 11 is a flow chart showing the operation of the display device according to the second embodiment.

At a step S101 of FIG. 10, a command of the operator is received from a known remote control means while the display device 21 is in a normal display mode, i.e., in a state of waiting for a command from the operator.

At a step S102, the current state of the display device 21 is checked. At a step S103, a check is made particularly for the image writing positions (states) of the light blocking plate 38b, the mirror 4 and the prism 41 or the female helicoids 38 and 40. The position of that unit part of the display device is a key to writing and display actions of the device. Any abnormality is first detected at this step.

If the light blocking plate 38b is found to be in an abnormal position, the flow of operation proceeds to a step S104 for a recovery action. At the step S104, the stepping motor (STM) 36 is driven to rotate clockwise. At a step S105, the mirror 42 and the light blocking plate 38b are moved to their left end standby positions as shown in FIG. 6. The flow then proceeds to a step S108.

If the light blocking plate 38b is found at the step S103 to be in a standby position, the flow proceeds to a step S106. At the step S106, the standby position of the light blocking plate 38b is checked to find if it is a left end standby position, which is a first standby position. If so, the flow proceeds to the step S108. If not, and the standby position is found to be a right end standby position, which is a second standby position, the flow branches to a step 110.

In a case where the light blocking plate 38b is in the first standby position, control actions are carried out in the following manner. At the step S108, a check is made to find if a picture 23a on the film 23 within the scanner unit 31 is a picture designated by the remote control means. If not, the flow proceeds to a step S109 to transport the film by a known film transport mechanism to the position of the picture designated by the operator. After that, the flow proceeds to a step S114. At the step S114, a flag of decision P=0 is set in a temporary memory RAM for the system of the display device. At a step S115, the back light 43 for display is put out.

If the light blocking plate 38b, etc., are found at the step S106 to be in the second standby position, the flow proceeds to a step S110. At the step S110, the scanner unit 31 is checked to find if the picture (frame) 23a is the picture desired by the operator. If not, the flow proceeds to a step S111 to move the film to the designated picture as mentioned above. If so, the flow proceeds to a step S112. At the step S112, the film is moved further to the end position of the same picture. In other words, the system of the device is arranged such that, in a case where the light blocking plate 38b, etc., have been moved to the rightmost end position by an image writing process, the next image writing process is reversely performed, i.e., from the right end position toward the left end position. Compared with a system arranged to start writing always from the left end, the system of this embodiment is arranged to permit a speedier operation.

After execution of the step S112 as mentioned above, the flow proceeds to a step S113. At the step S113, a flag of decision P=1 is set at the RAM as information on reverse scanning. The flow then proceeds to a step S115 to put out the back light 43.

It goes without saying that an image last written into the SLM 30 before the step S115 is visible to the operator. Therefore, the flow of operation which is arranged to put out the display by a minimum amount of process during a new image writing action on the SLM 30 imparts an agreeable feeling of operation to the operator.

When the back light 43 is put out at the step S115 as mentioned above, the existing display disappears, although it is still darkly visible due to external light. The flow then proceeds to a step S116. At the step S116, the polygonal mirror 34 begins to rotate. At a step S117, the above-stated flag which stores information on the direction of writing into the SLM 30 is read out to find if the writing is in the forward direction (P=0). If so, the flow proceeds to a step S118. At the step S118, the film is transported forward. At a step S119, the stepping motor (STM) 36 is driven counterclockwise to move the light blocking plate 38b, etc., rightward, as viewed in FIG. 6, in synchronism with the forward transport of the film.

The movement of the light blocking plate 38b, etc., is read by the photo-sensor (not shown) through the detection pattern 51. By this, the position of writing by the semiconductor laser 32 is accurately detected. At a step S120, a reverse electric field is applied only to the parts of the conductive pattern (of the ITO film) 30c which are to be erased. After these parts are erased, the flow proceeds to a step S121. At the step S121, at the same time that forward electric fields are applied to the erased conductive pattern parts, a new image is written into the picture element parts of the erased conductive pattern parts (to a photoconductor layer, to be exact) by applying the writing signal of the semiconductor laser 32b corresponding to a writing signal, which is obtained by negative/positive inverting a picture element reading signal from the film scanner part.

At a step S122, the action described above is carried on. At a step S123, a check is made to find if one frame amount of film has been completely processed. If not, the flow returns to the step S117 to repeat the above-stated steps. If so, the flow proceeds to a step S128.

Further, if the writing direction is found at the step S117 to be not the forward direction (P=1), thus indicating the necessity of film scanning in the reverse direction, the flow of operation proceeds to a step S124. At the step S124, the film transport motor is driven to rotate reversely. At a step S125, the stepping motor 36 is driven clockwise in synchronism with the reverse rotation of the film transport motor. The position of the stepping motor 36 is accurately detected by means of the detection pattern 51. Then, at a step S126, the semiconductor laser 32b is, this time, used as a preceding erasing laser, that is, to apply reverse electric fields to the pattern parts which are hit by the semiconductor laser 32b. At a step S127, the semiconductor laser 32a is used as a writing laser. The flow then proceeds to the step S122 to carry on this action until the whole image of one frame portion of film is found at the step S123 to have been completely written in. Upon detection of completion of image writing, the flow proceeds to the step S128.

At steps S128 to S130, the stepping motor 36, the polygonal mirror 34 and the known film transport motor which is transporting the film 23 are respectively stopped from rotating. At a step S131, the back light 43 is lighted up to let the operator see the image which has been just written in. At a step S132, the flow comes to an end, and the device resumes the state of waiting for a command from the remote control means at the start step of the flow of operation.

The second embodiment is arranged to A/D convert R, G and B image signals obtained from the CCD 26 of the film scanner and to write them into the SLM 30 to display an image carried by them for the operator. However, it is of course easily feasible to insert three color signals coming from a personal computer into the mixing circuit 28 and to display an image carried by them.

Further, signals of a CD-ROM and video signals also can be displayed in like manner without difficulty.

In the foregoing description of the first and second embodiments, the SLMs of two different kinds have been described with reference to FIGS. 4 and 7. However, these SLMs have no difference between them in respect of their fundamental functions. Further, both of them use the high-speed responsive FLC, so that the speed of change-over of film frames can be increased.

According to the structural arrangement of each of the first and second embodiments described, a display device capable of showing images of an extremely high picture quality can be simply arranged at a low cost.

In each of the first and second embodiments, a flash unit generally employed for compact cameras is used for the illumination unit for negative films. Potentials are supplied to the photoconductor layers of the SLM only for a short period of time in synchronism with the light emission by the flash unit. By this arrangement, an image can be written into the SLM in a very short period of time without necessitating use of any light blocking cover for shielding the SLM from external light, so that the display device can be more compactly arranged. The color SLM is arranged to be of a transmission light reading type and to be illuminated, for reading after the supply of potentials is cut off, with an illumination unit such as a fluorescent lamp which is arranged for reading separately from the writing light. By virtue of that arrangement, the display device capable of showing images with a very high picture quality can be arranged at a very low cost.

Further, according to the arrangement of each of the first and second embodiments, a display device of excellent operability can be arranged to be capable of showing still images of a high picture quality like that of a silver-halide print, to be in a shape which is thin enough for hanging on a wall and also to be capable of displaying not only images recorded in a silver-halide film but also image data or video signals of a CD-ROM or the like coming through a personal computer.

(Third Embodiment)

Figure 12:
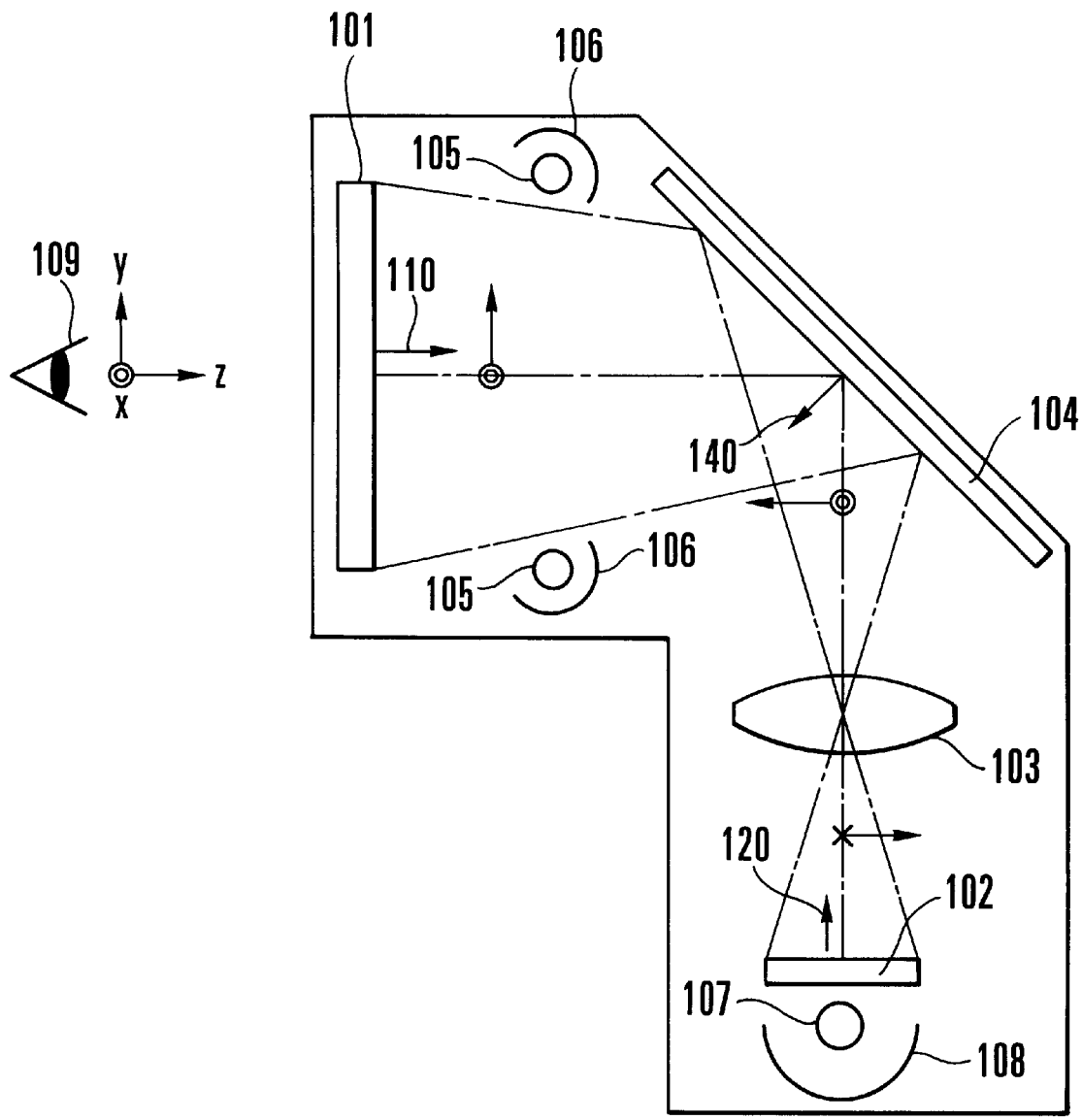
FIG. 12 is a schematic illustration of a display device arranged as a third embodiment of the invention.
Figure 13:
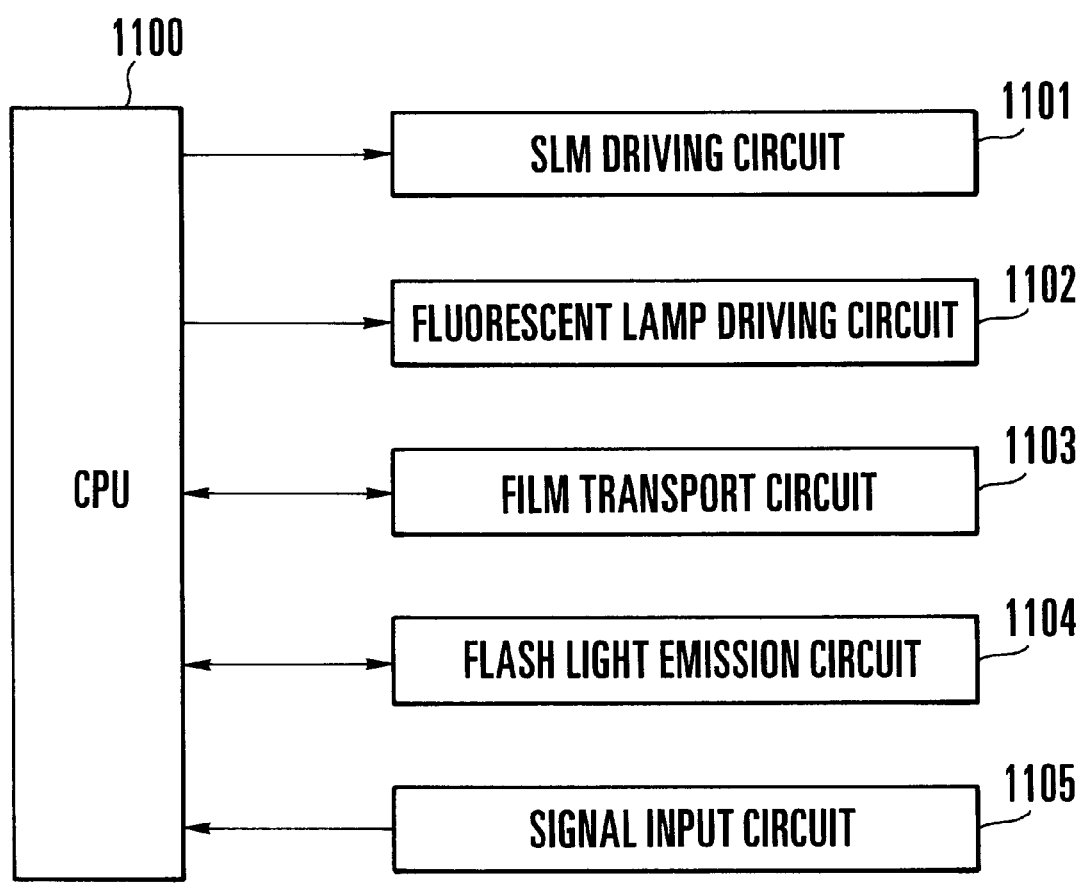
FIG. 13 is a block diagram showing a control part of the display device according to the third embodiment.
Figure 14:
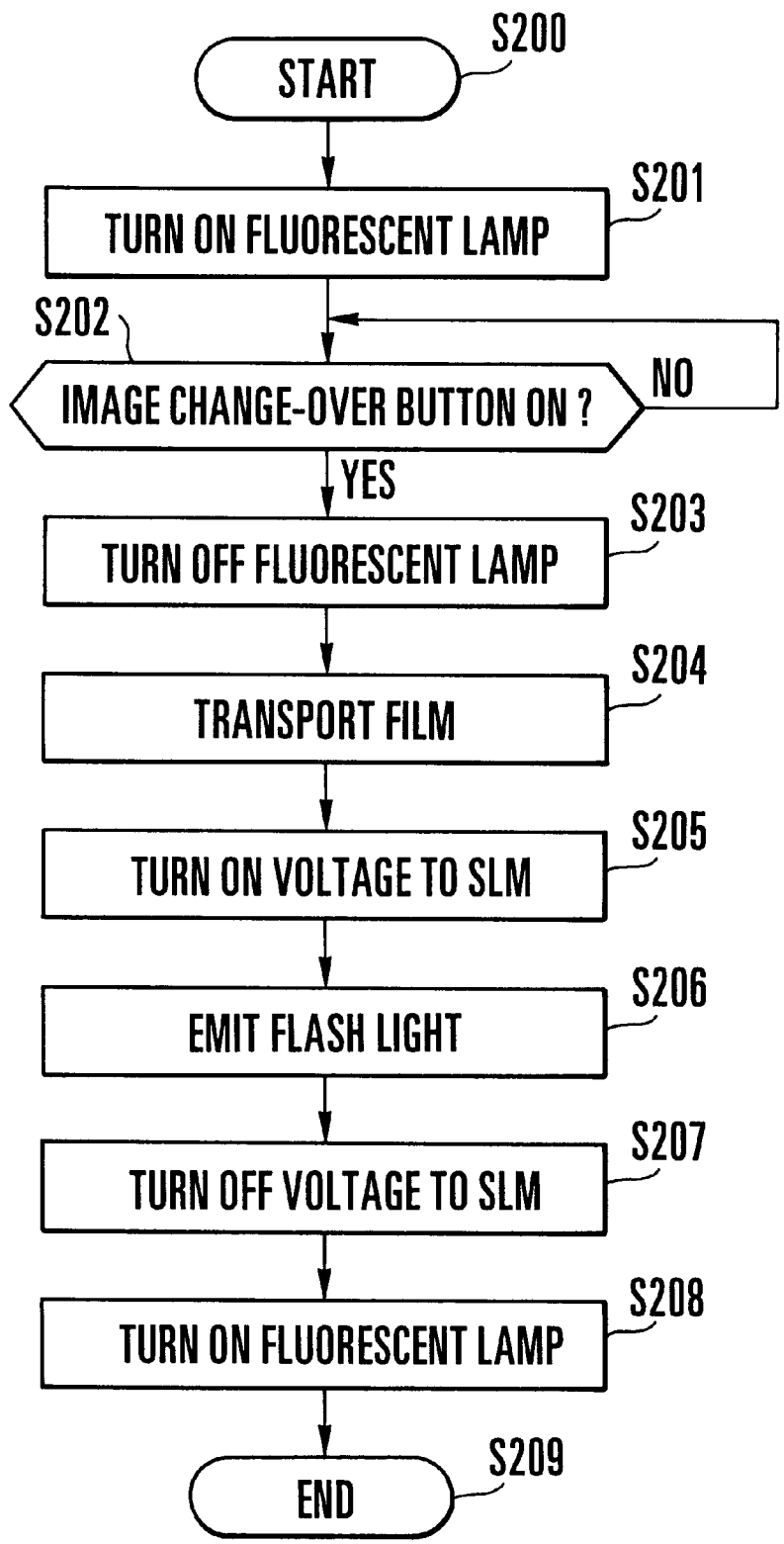
FIG. 14 is a flow chart showing an operation of the control part shown in FIG. 13.
Figure 15:
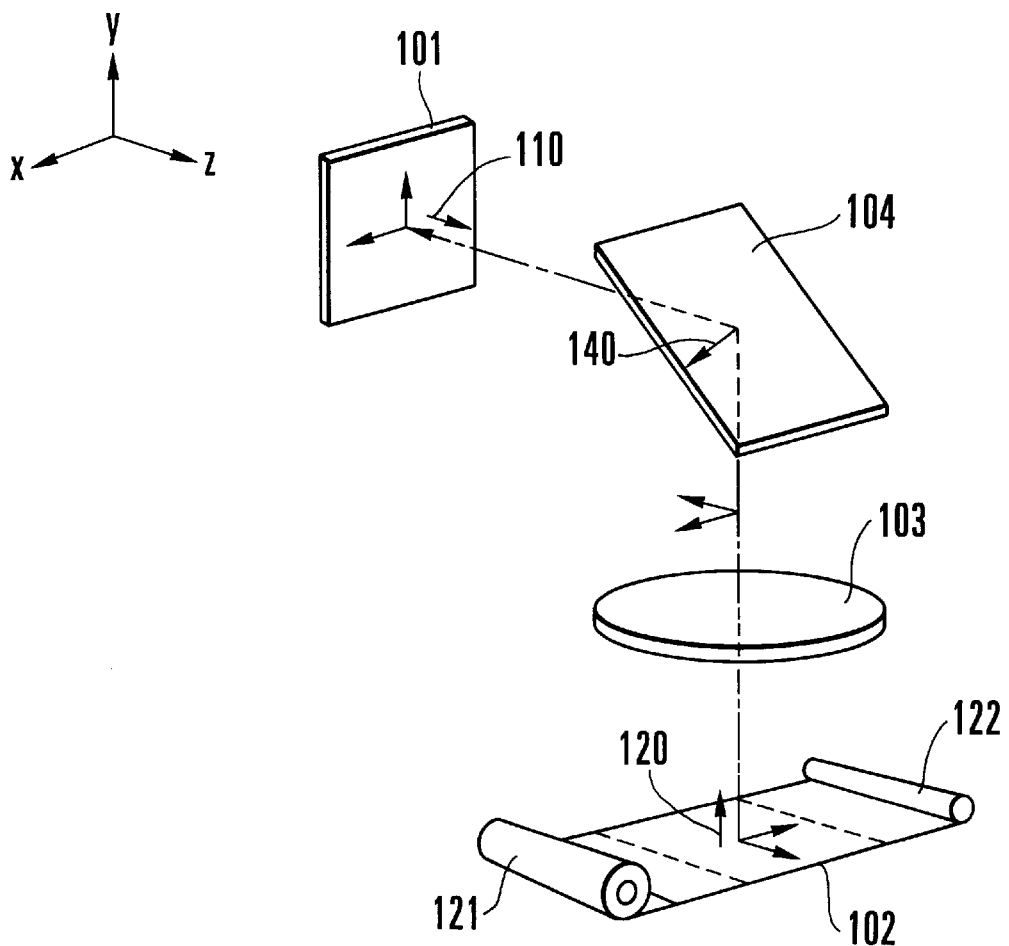
FIG. 15 schematically shows the arrangement of an optical system included in the display device according to the third embodiment.

FIGS. 12 and 15 show the arrangement of a display device (image display device) arranged according to the invention as a third embodiment thereof. FIG. 13 shows an electric circuit of the display device. FIG. 14 is a flow chart showing a flow of operation of the display device.

The display device according to the third embodiment of the invention comprises a spatial light modulator (SLM) 101, a xenon lamp 107 arranged to illuminate a film 102 pulled out of a film cartridge 121 from behind or from below, a reflection shade 108 which is provided for efficiently collecting a light emitted from the xenon lamp 107, a combination of a projection lens 103 and a reflection mirror 104 arranged to project a film image on the SLM 101, two fluorescent lamps 105 for illuminating the SLM 101 in which a film image is stored, in the direction which is the same as the film image projecting direction, and two reflection shades 106 arranged to efficiently converge on the SLM 101 the light from the fluorescent lamps 105. The two fluorescent lamps 105 and the two reflection shades 106 are symmetrically arranged in pairs with respect to the center of the SLM 101, i.e., the optical axis of the writing light, so that the SLM 101 can be uniformly illuminated in a light transmissive manner.

The SLM 101 is composed of a color filter of pure colors or complementary colors, an ITO film arranged to form one of two transparent electrodes, a photoconductor layer made of an organic semiconductor film or the like, a liquid crystal layer made of a ferroelectric liquid crystal (FLC) or the like, an orientation film, an ITO film which forms the other transparent electrode, and polarizing plates and glass plates, or layers, arranged to have the above-stated parts sandwiched in between them. The SLM 101 is arranged such that when an image is projected thereon with predetermined voltages applied to the two transparent electrodes, the image is stored in the liquid crystal layer. The image stored is retained there even after the voltage application is stopped. The image stored in the liquid crystal layer is viewable from the front side when the SLM 101 is transmissively illuminated by the fluorescent lamps 105 from behind, i.e., on the image projecting side of the SLM 101.

Referring to FIG. 13, a control part provided for control over the display device is composed of an SLM driving circuit 1101 arranged to apply voltages to the SLM 101 to cause the SLM 101 to perform the image storing action, a fluorescent lamp driving circuit 1102 arranged to control the light emission of the fluorescent lamps 105, a film transport circuit 1103 arranged to control winding and rewinding the film 102, a flash light emission circuit 1104 arranged to control the light emission of the xenon lamp 107, a CPU 1100 arranged to control the actions of these circuits, and a signal input circuit 1105 arranged to input to the CPU 1100 signals coming from various switches provided on the display device.

With the display device arranged in the above-stated manner, the display device (or CPU 1100) operates according to procedures set forth as shown in the flow chart in FIG. 14. Referring to FIG. 14, the operator turns on a power supply of the display device at a step S200. At a step S201, the CPU 1100 sends a signal to the fluorescent lamp driving circuit 1102 to cause the fluorescent lamps 105 to light up. Then, the SLM 101 is uniformly illuminated to enable the viewer, or operator, to view a film image already stored in the SLM 101.

At a step S202, when an image change-over button which is not shown is pushed, or turned on, by the viewer (operator), the CPU 1100 detects the on-state of the image change-over button through the signal input circuit 1105. At a step S203, the CPU 1100 causes the fluorescent lamps 105 to be put out by sending a signal to the fluorescent lamp driving circuit 1102. At a step S204, the CPU 1100 sends a signal to the film transport circuit 1103 to cause the film 102 to be transported to a predetermined position. Then, the film 102 is pulled out from the film cartridge 121 to be taken up on a spool 122.

At a step S205, when the film 102 is transported to the predetermined position, the CPU 1100 causes the SLM driving circuit 1101 to apply a predetermined voltage to the SLM 101. At a step S206, the CPU 1100 causes the flash light emission circuit 1104 to illuminate the film 102 by emitting a flash light from the xenon lamp 107. The flash light from the xenon lamp 107 is reflected in part by the reflection shade 108 to uniformly illuminate the film 102. Then, light passing through the film 102 comes to be projected on the SLM 101 through the projection lens 103 and the reflection mirror 104. Incidentally, the film 102 and the SLM 101 are disposed to be conjugate to each other with respect to the projection lens 103.

After the film image is projected on the SLM 101 and is stored in the SLM 101 by the memory action of the ferroelectric liquid crystal layer which constitutes a part of the SLM 101, the application of voltage to the SLM 101 is cut off at a step S207.

At a step S208, upon completion of the process of writing the film image into the SLM 101, the CPU 1100 sends a signal to the fluorescent lamp driving circuit 1102 to cause the fluorescent lamps 105 to light up, so that the SLM 101 is uniformly illuminated. Then, the light of illumination passing through the SLM 105 enables the viewer to view an object image recorded on the film 102.

Figure 16:
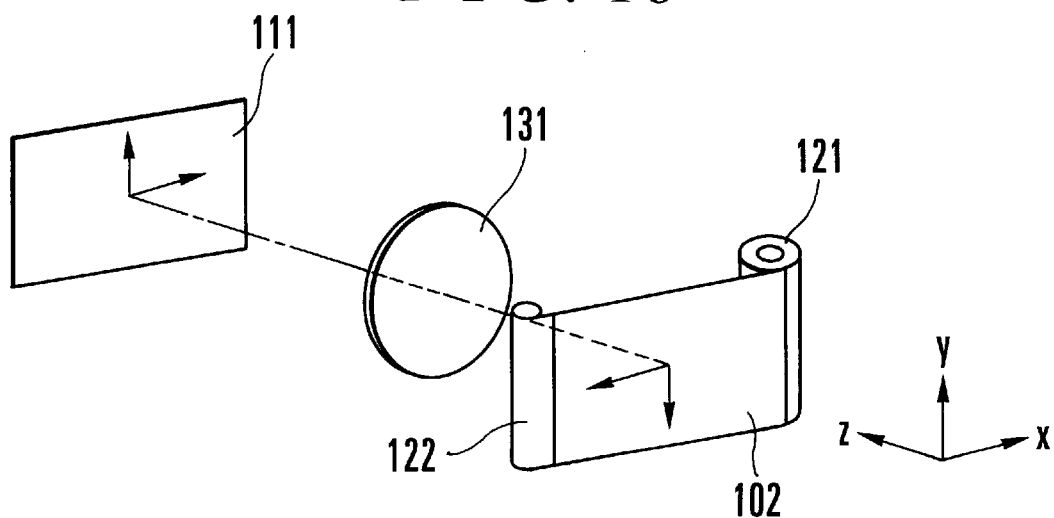
FIG. 16 shows a relation between an object and an image of the object in taking a shot with a camera in the third embodiment.

Referring to FIG. 16, in taking a picture with a camera, the facing direction of an object 111 to be photographed is in a relation to that of an object image formed on the film 102 through a photo-taking lens 131. In a case where the object 111 has the directions of arrows +y and +x with respect to the photographer, the object image is inverted by the photo-taking lens 131 to have the directions of arrows -y and -x. The object image is recorded on the film 102 in that state. In FIG. 16, a coordinate system expressed with x-y-z axes is a coordinate system of the viewer relative to the object of viewing. In the coordinate system, the axis x represents a transverse direction, i.e., the longitudinal direction of the film image, the axis y represents a vertical direction, i.e., the direction of width of the film image, and the axis z represents a viewing direction, i.e., the direction of an optical axis.

In the display device according to the third embodiment, as shown in FIG. 15, the film 102 is set on the display device in such a way as to cause the object image to have the directions of arrows +z and -x of the coordinate system shown in FIG. 16 with respect to the viewer 109. In the case of the third embodiment, the reflection mirror 104 is arranged to have its normal vector 140 in parallel to a plane (y-z plane) defined by the normal vector 110 of the SLM 101 and the normal vector 120 of the film 102.

In this case, an object image recorded on the film 102 is inverted by the projection lens 103 to have the directions of arrows -z and +x. After that, the image is reflected by the reflection mirror 104 to be made into an object image having the directions of arrows +y and +x, i.e., inverted in the direction of width of the film image with respect to the optical axis, before it is formed on the SLM 101.

As a result, for the viewer who is viewing the image from on the front side of the SLM 101, i.e., from the opposite side of the film image projecting surface, the facing direction of the object image displayed on the SLM 101 coincides with that of the photographed object, so that the display device enables the viewer to view the image on display as facing in the correct direction.

The display device according to the third embodiment is arranged to set the film 102 in such a way as to have the film cartridge 121 on the side of the projection optical system, so that the display device can be compactly arranged.

Further, while the third embodiment has been described as being arranged to have the object image inverted by the reflection mirror 104 in the direction of width of the film image, that arrangement may be changed to invert the object image in the longitudinal direction of the film image, instead of in the direction of its width.

(Fourth Embodiment)

Figure 17:
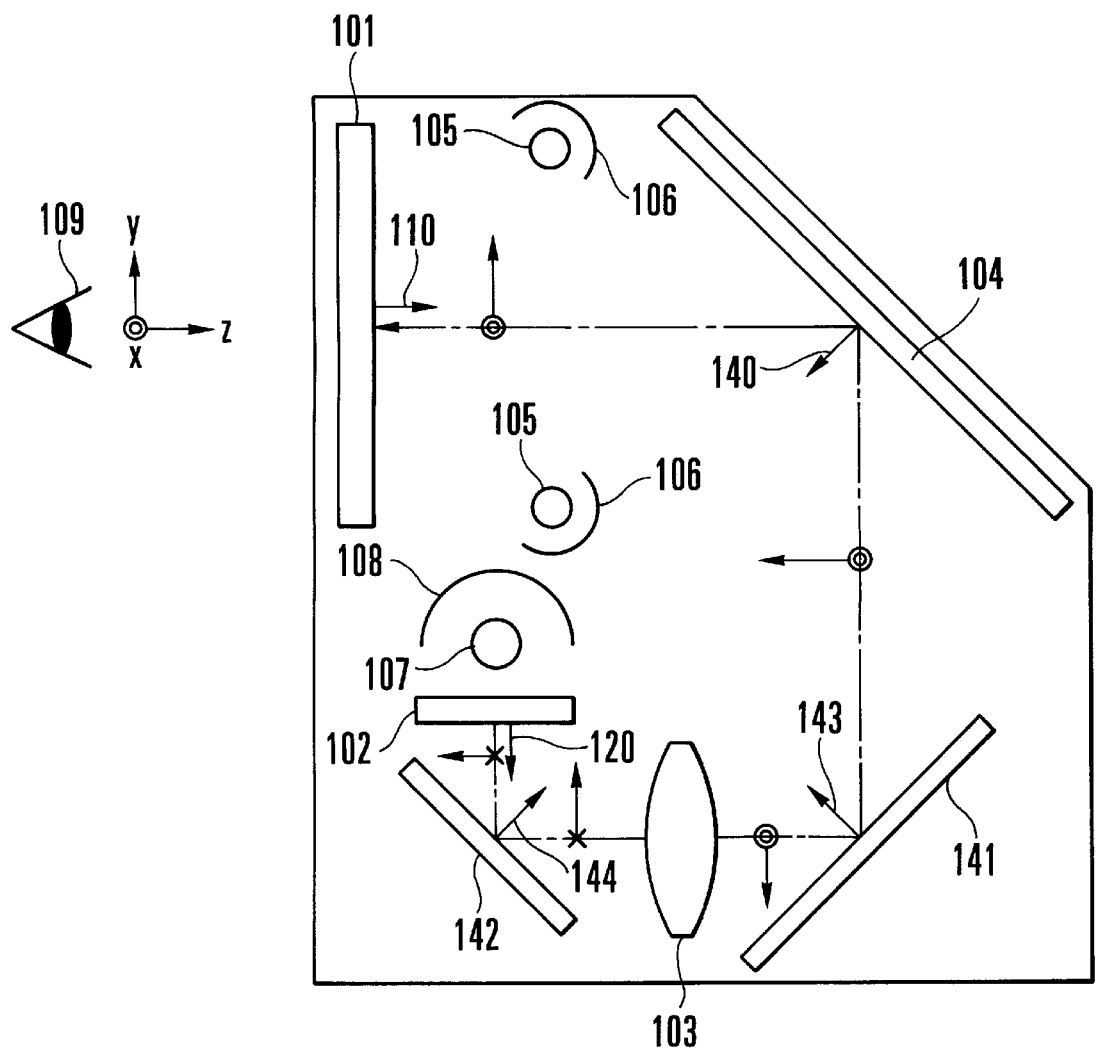
FIG. 17 schematically shows a display device arranged as a fourth embodiment of the invention.

FIG. 17 shows a display device (image display device) arranged according to the invention as a fourth embodiment thereof. The fourth embodiment comprises the same component elements as those of the third embodiment. These same elements are indicated by the same reference numerals and the details of them are omitted from the following description. The control part of the display device of the fourth embodiment is arranged to operate in the same manner as that of the third embodiment. In FIG. 17, a coordinate system expressed as x-y-z axes is also a coordinate system of the viewer for an object of viewing, like in the third embodiment.

The fourth embodiment differs from the third embodiment in the following point. The fourth embodiment has three reflection mirrors 104, 141 and 142 used for projecting a film image on the SLM 101. The reflection mirrors 104 and 141 are disposed between the projection lens 103 and the SLM 101. The reflection mirror 142 is disposed between the projection lens 103 and the film 102. The normal vector 144 of the reflection mirror 142, the normal vector 143 of the reflection mirror 141 and the normal vector 140 of the reflection mirror 104 are arranged to be in parallel respectively with a plane (y-z plane) determined by the normal vector 110 of the SLM 101 and the normal vector 120 of the film 102.

In the display device according to the fourth embodiment, the film 102 is set to cause the object image to have the directions of arrows -z and -x in a coordinate system of the viewer 109 for the object of viewing. In this case, an object image recorded on the film 102 is reflected by the reflection mirror 142 to be changed into an object image having the directions of arrows +y and -x, i.e., inverted in the direction of width of a film image with respect to an optical axis, before it falls on the projection lens 103.

The object image thus reflected is next inverted by the projection lens 103 to have the directions of arrows -y and +x. After that, the object image is reflected by the reflection mirror 141 to be changed into an object image having the directions of arrows -z and +x, i.e., inverted in the direction of width of the film image with respect to the optical axis. After the reflection mirror 141, the object image is further reflected by the reflection mirror 104 to be changed into an object image having the directions of arrows +y and +x, i.e., inverted in the direction of the width of the film image with respect to the optical axis, before it is formed on the SLM 101.

As a result, for the viewer who is viewing the image from on the front side of the SLM 101, i.e., from the opposite side of the film image projecting surface, the facing direction of the object image displayed on the SLM 101 coincides with that of the photographed object, so that the display device enables the viewer to view the image on display as facing in the correct direction, in the same manner as in the case of the third embodiment.

While the fourth embodiment has been described as being arranged to have the object image inverted by the reflection mirrors 104, 141 and 142 in the direction of width of the film image, that arrangement may be changed to have the object image inverted by these reflection mirrors, in the longitudinal direction of the film image, instead of in the direction of its width.

(Fifth Embodiment)

Figure 18A:
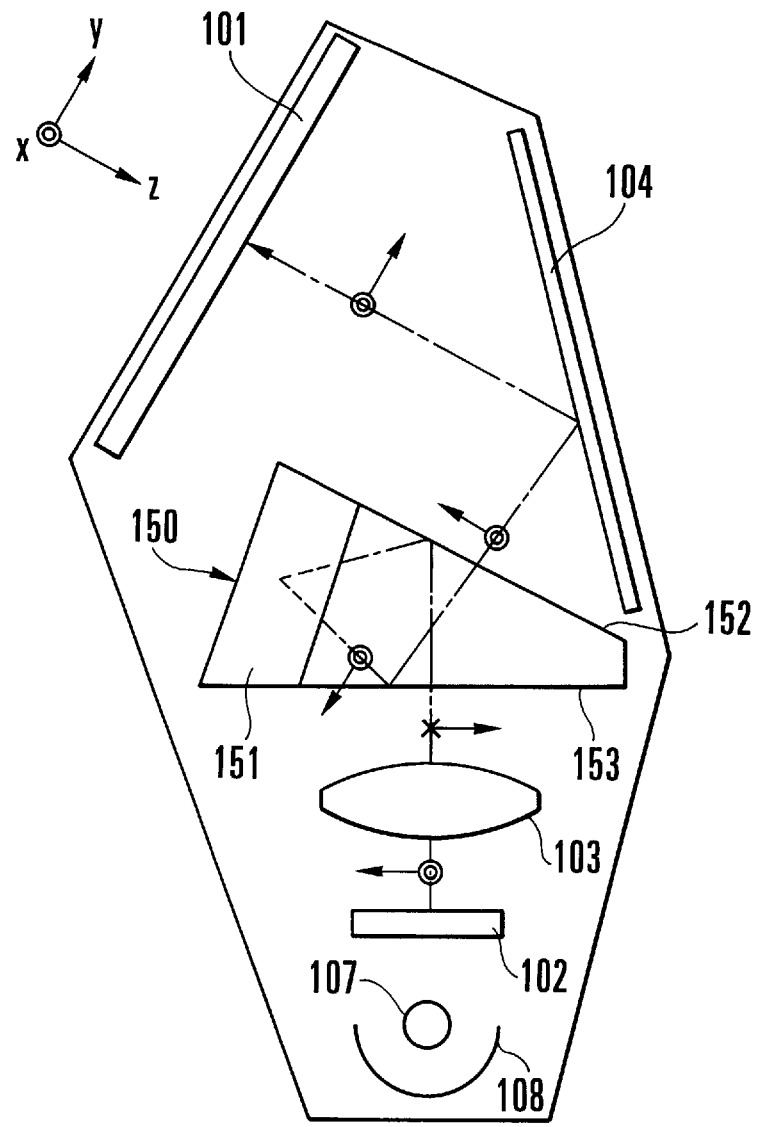
FIG. 18(a) schematically shows a display device arranged as a fifth embodiment of the invention.
Figure 18B:
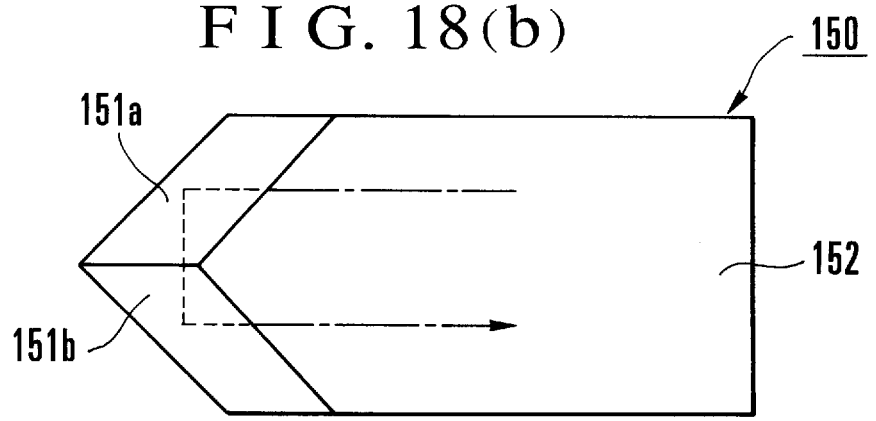
FIG. 18(b) is a plan view of a prism used in the same display device.

FIGS. 18(a) and 18(b) show a display device (image display device) arranged as a fifth embodiment of the invention. The fifth embodiment comprises the same component elements as those of the third embodiment. These same elements are indicated by the same reference numerals and the details of them are omitted from the following description. The control part of the display device of the fifth embodiment is arranged to operate in the same manner as that of the third embodiment. In FIG. 18(a), a coordinate system expressed as x-y-z axes is also a coordinate system of the viewer for an object of viewing, like in the case of the third embodiment.

The fifth embodiment differs from the third embodiment in that a prism 150 is added between the projection lens 103 and the reflection mirror 104.

The prism 150 has surfaces 152 and 153 having normal vectors in parallel to a plane (y-z plane) which is determined by the normal vector of the SLM 101 and the normal vector of the film 102. Further, as shown in FIG. 18(b), the prism 150 is provided with reflection surfaces 151a and 151b which are in a roof-like shape. These two reflection surfaces 151a and 151b jointly form one reflection face 151 and are orthogonally intersecting each other. The normal vectors of the reflection surfaces 151a and 151b are aslant at an angle of 45 degrees with respect to the plane (y-z plane) determined by the normal vector of the SLM 101 and the normal vector of the film 102.

A light flux incident on the prism 150 passes through the surface 153 and then is totally reflected by the surface 152. The incident light flux is further reflected by the roof-shaped reflection surfaces 151a and 151b and totally reflected by the surface 153. After that, the light flux passes through the surface 152 to exit from the prism 150.

In the display device according to the fifth embodiment, the film 102 is set, as shown in FIG. 18(a), to have the object image facing leftward (in the directions of arrows −y and −z) and also perpendicularly upward (in the direction of arrow +x) with respect to the paper surface of the drawing. In this case, an object image recorded on the film 102 is inverted by the projection lens 103 rightward as viewed in the drawing (in the directions of arrows +y and +z) and also perpendicularly downward (in the direction of arrow −x) with respect to the paper surface of the drawing. The object image thus inverted comes to enter the prism 150.

The object image incident on the prism 150 passes through the surface 153 as it is. After passing there, the object image is totally reflected by the surface 152 to be inverted downward to the right (in the directions of arrows −y and +z) with respect to the paper surface of the drawing and also perpendicularly downward (in the direction of arrow −x) as indicated by arrows. In other words, the object image is inverted to the direction of width of the film image with respect to an optical axis. The object image is next reflected by the roof-shaped reflection surfaces 151a and 151b downward to the left (in the directions of arrows −y and −z) with respect to the paper surface and also perpendicularly upward (in the direction of arrow +x) as indicated by arrows. In other words, the object image is reflected in the longitudinal direction of the film image with respect to the optical axis. After the surfaces 151a and 151b, the object image is totally reflected by the surface 153 upward to the left (in the directions of arrows +y and −z) and also perpendicularly upward (in the direction of arrow +x) with respect to the paper surface of the drawing. In other words, the object image is inverted in the direction of width of the film image with respect to the optical axis. The object image then exits from the surface 152 of the prism 150.

After the prism 150, the object image is reflected by the reflection mirror 104 to be changed into an object image having the directions of arrows +y and +x, i.e., in the state of being inverted in the direction of width of the film image with respect to the optical axis. The object image is then formed on the SLM 101.

As a result, for the viewer who is viewing the image from on the front side of the SLM 101, i.e., from the opposite side of the film image projecting surface, the facing direction of the object image displayed on the SLM 101 coincides with that of the photographed object, so that the display device enables the viewer to view the image on display as facing in the correct direction, in the same manner as in the case of the third embodiment.

While the fifth embodiment has been described as being arranged to have the object image inverted by the surfaces 152 and 153 of the prism 150 and the reflection mirror 104 in the longitudinal direction of the film image, that arrangement may be changed to have the object image inverted by these two surface of the prism 150 and the reflection mirror in the longitudinal direction of the film image and, after that, inverted by the roof shaped reflection surfaces of the prism in the direction of width of the film image.
(Sixth Embodiment)

Figure 19:
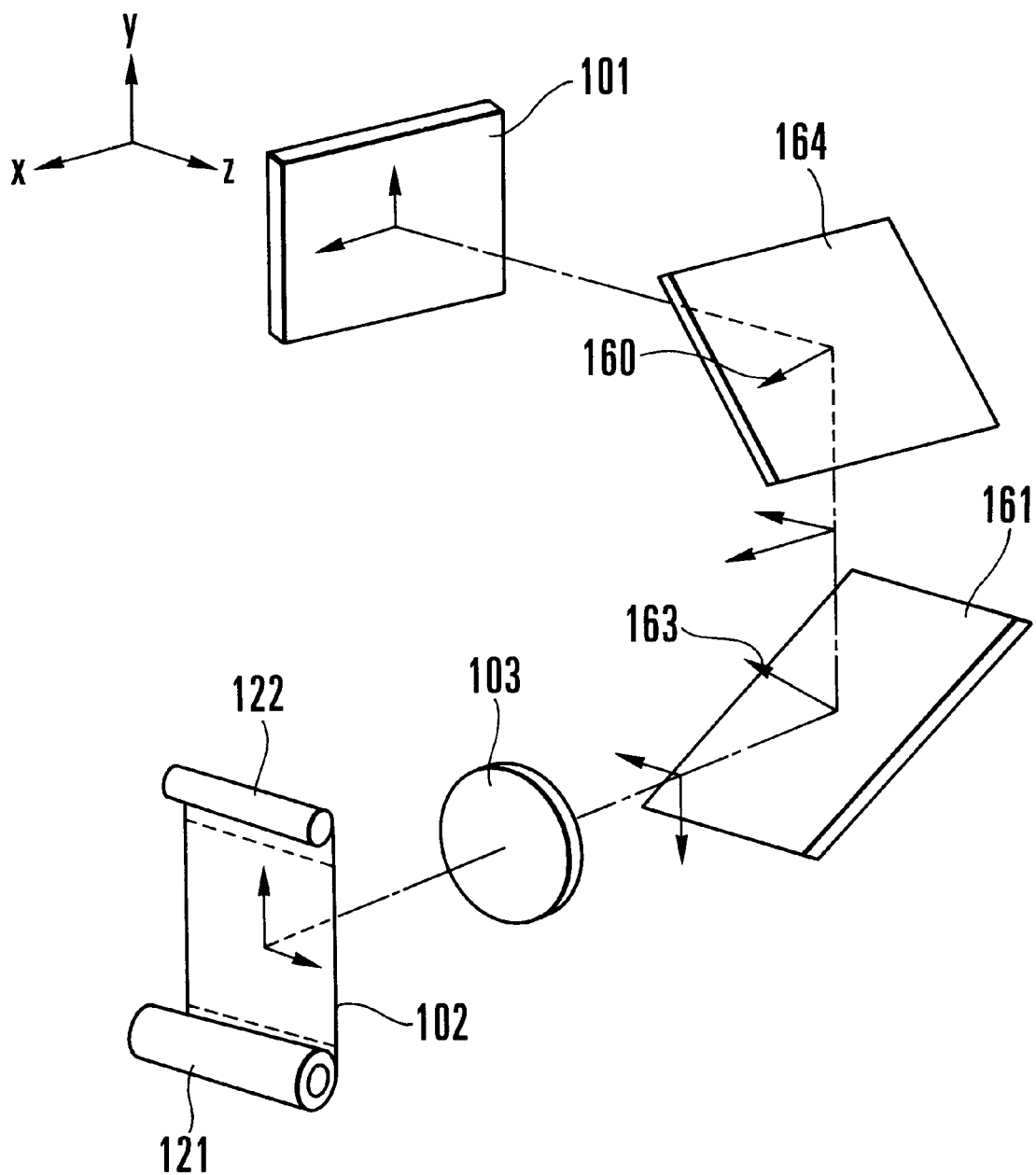
FIG. 19 shows the arrangement of an optical system included in a display device arranged according to the invention as a sixth embodiment thereof.

FIG. 19 shows a display device (image display device) arranged as a sixth embodiment of the invention.

The sixth embodiment comprises the same component elements as those of the third embodiment. The same elements are indicated by the same reference numerals and the details of them are omitted from the following description. The control part of the display device of the sixth embodiment is arranged to operate in the same manner as that of the third embodiment. In FIG. 19, a coordinate system expressed as x-y-z axes is a coordinate system of the viewer for an object of viewing, like in the case of the third embodiment.

The sixth embodiment differs from the third embodiment in that the sixth embodiment has two reflection mirrors 164 and 161 for projecting a film image on the SLM 101. The normal vector 160 of the reflection mirror 164 is in parallel with the surface of the film 102 (a plane in parallel with a y-z plane). The normal vector 163 of the reflection mirror 161 is in parallel with the SLM 101 (a plane in parallel with an x-y plane).

The display device according to the sixth embodiment is arranged to set a film 102 in such a way as to cause an object image to have the directions of arrows +z and +y in FIG. 19. In this case, the object image recorded on the film 102 is inverted by the projection lens 103 to be changed into an object image having the directions of arrows −z and −y. After that, the object image is reflected by the reflection mirror 161 to be changed into an object image having the directions of arrows −z and +x, i.e., inverted in the longitudinal direction of the film image with respect to an optical axis. The object image is further reflected by the reflection mirror 164 to be changed into an object image having the directions of arrows +y and +x, i.e., inverted in the direction of width of the film image with respect to the optical axis and is then formed on the SLM 101.

As a result, for the viewer who is viewing the image from on the front side of the SLM 101, i.e., from the opposite side of the film image projecting surface, the facing direction of the object image displayed on the SLM 101 coincides with that of the photographed object, so that the display device enables the viewer to view the image on display as facing in the correct direction, in the same manner as in the case of the third embodiment.

While the sixth embodiment has been described as being arranged to have the object image inverted by the reflection mirror 161 in the longitudinal direction of the film image and, after that, inverted by the reflection mirror 164 in the direction of width of the film image, that arrangement may be changed to have the object image inverted by one of the reflection mirrors first in the direction of width of the film image and, after that, inverted by the other reflection mirror in the longitudinal direction of the film image.

As described above, according to the arrangement of each of the third to sixth embodiments, reflection surfaces are arranged to invert the facing direction of an image, with respect to the optical axis, by an odd number of steps to obtain different inverting directions. The odd number of image inverting steps enables the image recorded on an original (film) to be projected on a storing display means in a state of facing its original facing direction. Therefore, the facing direction of an object image obtained at the time of photographing with a camera and its facing direction obtained at the time of viewing it coincide with each other.
(Seventh Embodiment)

Figure 20:
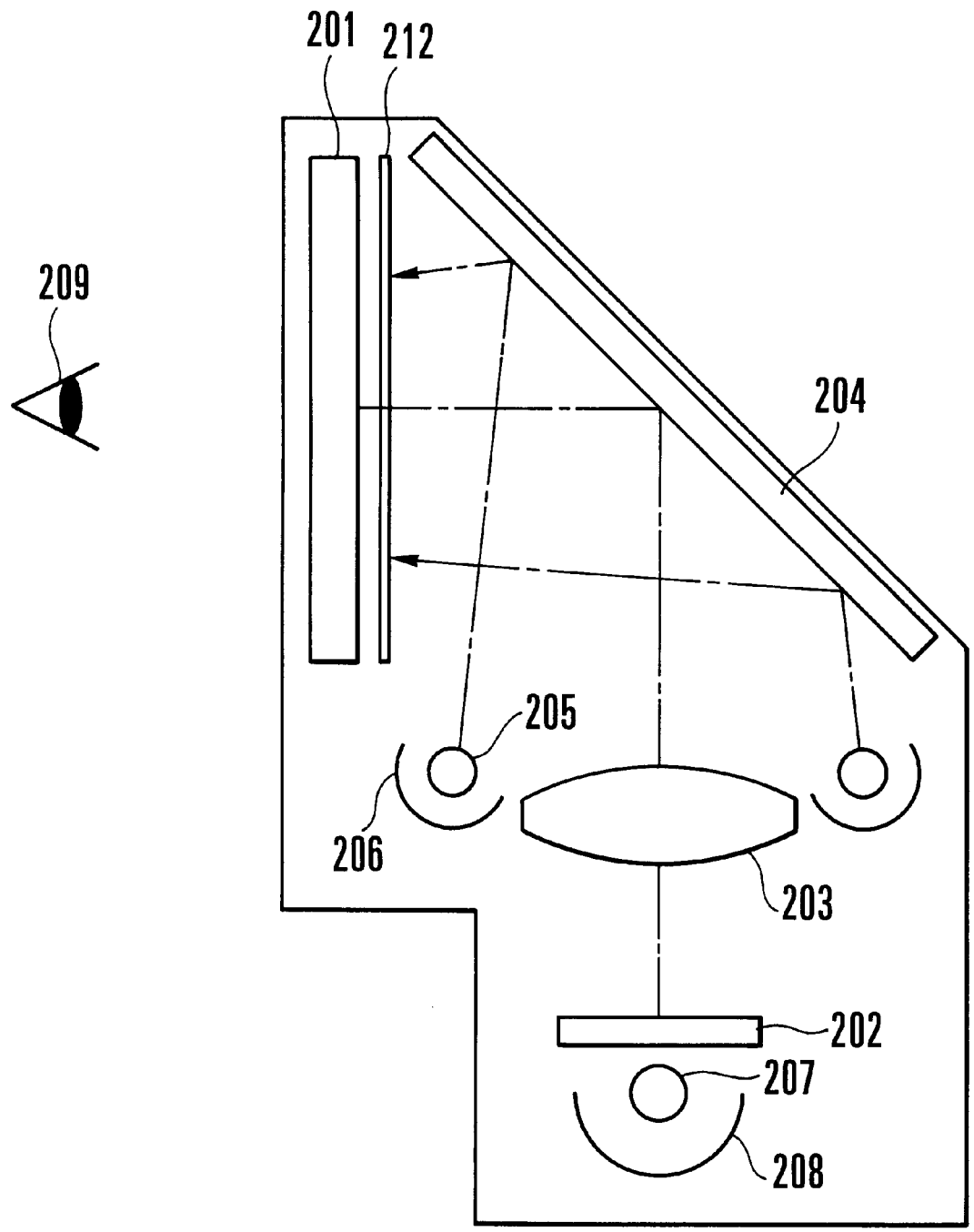
FIG. 20 schematically shows a display device arranged as a seventh embodiment of the invention.
Figure 21:
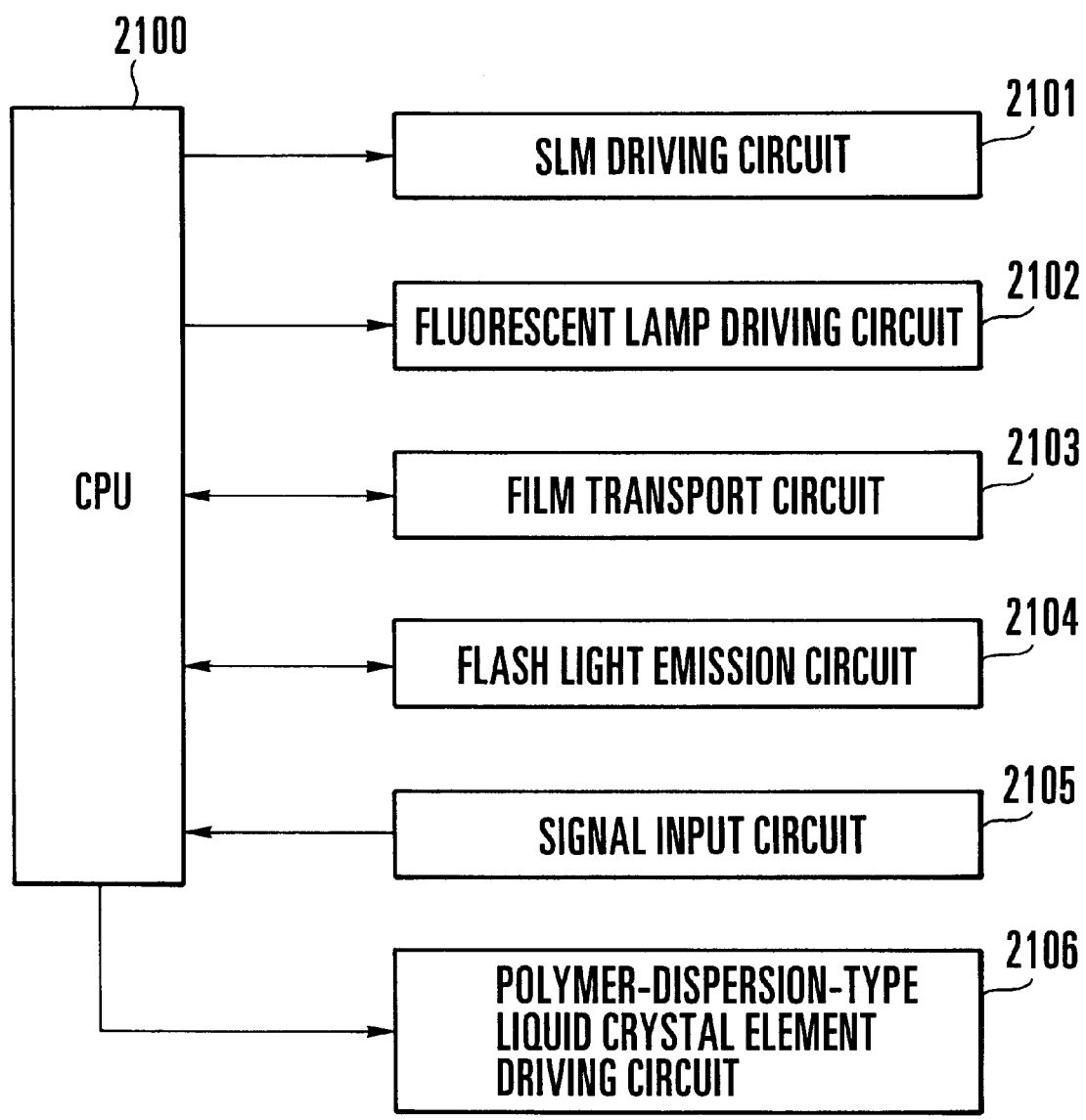
FIG. 21 is a block diagram showing a control part of the display device according to the seventh embodiment.
Figure 22:
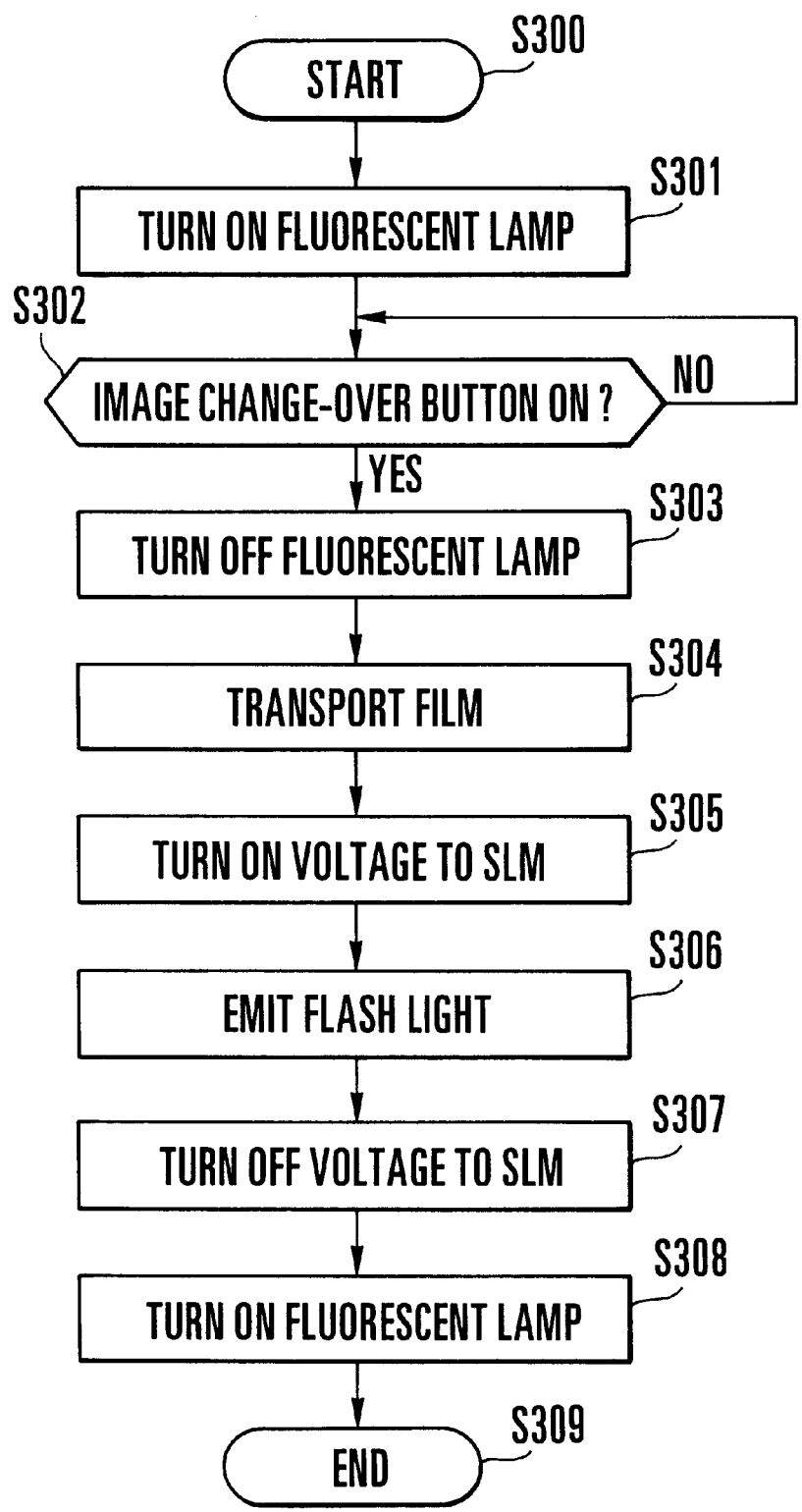
FIG. 22 is a flow chart showing an operation of the control part shown in FIG. 21.

FIGS. 20, 21 and 22 relate to a display device (image display device) arranged as a seventh embodiment of the invention. FIG. 21 shows the electric circuit arrangement of the display device. FIG. 22 shows in a flow chart a flow of operation of the display device.

Referring to FIG. 20, the display device according to the seventh embodiment comprises a spatial light modulator (SLM) 201, a xenon lamp 207 arranged to illuminate a film 202 pulled out of a film cartridge (not shown) from behind or from below, a reflection shade 208 which is provided for efficiently collecting a writing light emitted from the xenon lamp 207, a combination of a projection lens 203 and a reflection mirror 204 arranged to project a film image on the SLM 201, a polymer-dispersion-type liquid crystal element (light diffusing means) 212 disposed near the rear side of the SLM 201, fluorescent lamps 205 (reading illumination means) for illuminating the SLM 201 in which a film image is stored, from the direction which is the same as the direction in which a film image is projected, and a reflection shade 206 arranged to efficiently collect or converge the light emitted from the fluorescent lamps 205 on the SLM 201.

Each of the fluorescent lamps 205 is of a straight tube type and has a length about the same as the width of the image storing surface of the SLM 201. The fluorescent lamps 202, in conjunction with the structural arrangement of a reading illumination system described later, are arranged to be capable of uniformly illuminating the whole image storing surface of the SLM 201.

The polymer-dispersion-type liquid crystal element 212 is arranged to operate in a known manner, for example, as disclosed in Japanese Laid-Open Patent Application No. HEI 1-229232, etc.

The SLM 201 is composed of a lamination including a color filter of pure colors or complementary colors, an ITO film arranged to form one of two transparent electrodes, a photoconductor layer made of an organic semiconductor film or the like, a liquid crystal layer made of a ferroelectric liquid crystal (FLC) or the like, an orientation film, an ITO film which forms the other transparent electrode, and polarizing plates and glass plates arranged to have the above-stated parts sandwiched in between them. The SLM 101 is arranged such that when an image is projected thereon with predetermined voltages applied to the two transparent electrodes, the image is stored in the liquid crystal layer. The image stored is retained even after the application of voltage is stopped. The image stored in the liquid crystal layer is viewable from the front side when the SLM 201 is transmissively illuminated by the fluorescent lamps 205 from behind, i.e., on the image projecting side of the SLM 201.

Referring to FIG. 21, a control part provided for control over the display device is composed of an SLM driving circuit 2101 arranged to apply voltages to the SLM 201 to cause the SLM 201 to perform the image storing action, a fluorescent lamp driving circuit 2102 arranged to control the light emission of the fluorescent lamps 205, a film transport circuit 2103 arranged to control winding and rewinding actions on the film 202, a flash light emission circuit 2104 arranged to control the light emission of the xenon lamp 207, a CPU 2100 arranged to control the actions of these circuits, a signal input circuit 2105 arranged to input to the CPU 2100 signals coming from various switches provided on the display device, and a polymer-dispersion-type liquid crystal element driving circuit 2106 arranged to control the transmitting and diffusing states of the polymer-dispersion-type liquid crystal element 212.

With the display device arranged in the above-stated manner, the display device (or CPU 2100) operates according to procedures set forth as shown in a flow chart in FIG. 22. Referring to FIG. 22, the operator turns on a power supply of the display device at a step S300. At a step S301, the CPU 2100 causes the fluorescent lamps 205 to light up by sending a signal to the fluorescent lamp driving circuit 2102, and, at the same time, causes the polymer-dispersion-type liquid crystal element driving circuit 2106 to cut off supply of power to the polymer-dispersion-type liquid crystal element 212 so as to bring the polymer-dispersion-type liquid crystal element 212 into a diffused state. This allows the reading light from the fluorescent lamps 205 to uniformly illuminate the SLM 201 in a light transmissive manner through the reflection mirror 204 and the polymer-dispersion-type liquid crystal element 212. This state enables the viewer to view a film image already stored in the SLM 201.

At a step S302, when an image change-over button which is not shown is turned on by the viewer so as to change over images to be viewed, the CPU 2100 detects the on-state of the image change-over button through the signal input circuit 2105. At a step S303, the CPU 2100 causes the fluorescent lamps 205 to be put out by sending a signal to the fluorescent lamp driving circuit 2102. At a step S304, the CPU 2100 sends a signal to the film transport circuit 2103 to cause the film 202 to be transported to a predetermined position. Then, the film 202 is pulled out from the film cartridge to be taken up on a spool which is not shown.

At a step S305, when the film 202 is transported to the predetermined position, the CPU 2100 causes the SLM driving circuit 2101 to apply a predetermined voltage to the SLM 201. At a step S306, the CPU 2100 causes the flash light emission circuit 2104 to illuminate the film 202 by emitting a flash light from the xenon lamp 207. The flash light from the xenon lamp 207 is reflected in part by the reflection shade 208 to uniformly illuminate the film 202. Then, light passing through the film 202 is projected on the SLM 201 through the projection lens 203, the reflection mirror 204 and the polymer-dispersion-type liquid crystal element 212 which is in the light transmissive state. In this instance, the polymer-dispersion-type liquid crystal element driving circuit 2106 is caused to apply a voltage to the polymer-dispersion-type liquid crystal element 212 to bring it into the light transmissive state, so that the writing light is allowed to fall on the SLM 201 without hindrance. Incidentally, the film 202 and the SLM 201 are disposed to be conjugate with respect to the projection lens 203.

At a step S307, after the film image is projected on the SLM 201 and is stored in the SLM 201 by the memory action of the ferroelectric liquid crystal layer which constitutes a part of the SLM 201, the application of voltage to the SLM 201 is cut off.

At a step S308, upon completion of the process of writing the film image into the SLM 201, the CPU 2100 sends a signal to the fluorescent lamp driving circuit 2102 to cause the fluorescent lamps 205 to light up. The polymer-dispersion-type liquid crystal element driving circuit 2106 is caused to cut off the supply of power to the polymer-dispersion-type liquid crystal element 212 so as to bring the polymer-dispersion-type liquid crystal element 212 into a diffused state. As a result, the SLM 201 is uniformly illuminated through the polymer-dispersion-type liquid crystal element 212 by the fluorescent lamps 205. Then, the light of illumination passing through the SLM 201 enables the viewer 209 to view an object image recorded on the film 202.

In the case of the seventh embodiment, as shown in FIG. 20, its reading illumination system consists of two illumination systems, each of which consists of the fluorescent lamp 205 and the reflection shade 206. The two reading illumination systems are arranged near to the projection lens 203. Therefore, compared with a case where a reading illumination system is arranged between the SLM 201 and the reflection mirror 204, the seventh embodiment permits the SLM 201 and the reflection mirror 204 to be arranged closer to each other, so that the display device can be more compactly arranged by shortening the length of the optical path of a writing light projecting optical system.

In the seventh embodiment, the two reading illumination systems are symmetrically arranged with respect to the center of the optical axis of a writing light coming to the reflection mirror 204 through the projection lens 203. Further, a reading light emitted from the fluorescent lamps 205 is arranged to be reflected by the reflection mirror 204 which is provided intrinsically for reflecting a writing light before the reading light is diffused by the polymer-dispersion-type liquid crystal element 212 for illuminating the SLM 201 in a light transmissive manner. This arrangement obviates the necessity of arranging a reflecting means for the reading light. Besides, compared with a case where the SLM 201 is arranged to be illuminated directly with the light of the fluorescent lamps 205, the seventh embodiment enables the viewer 209 to view a display image of a higher picture quality as it is more uniformly illuminated.

(Eighth Embodiment)

Figure 23:
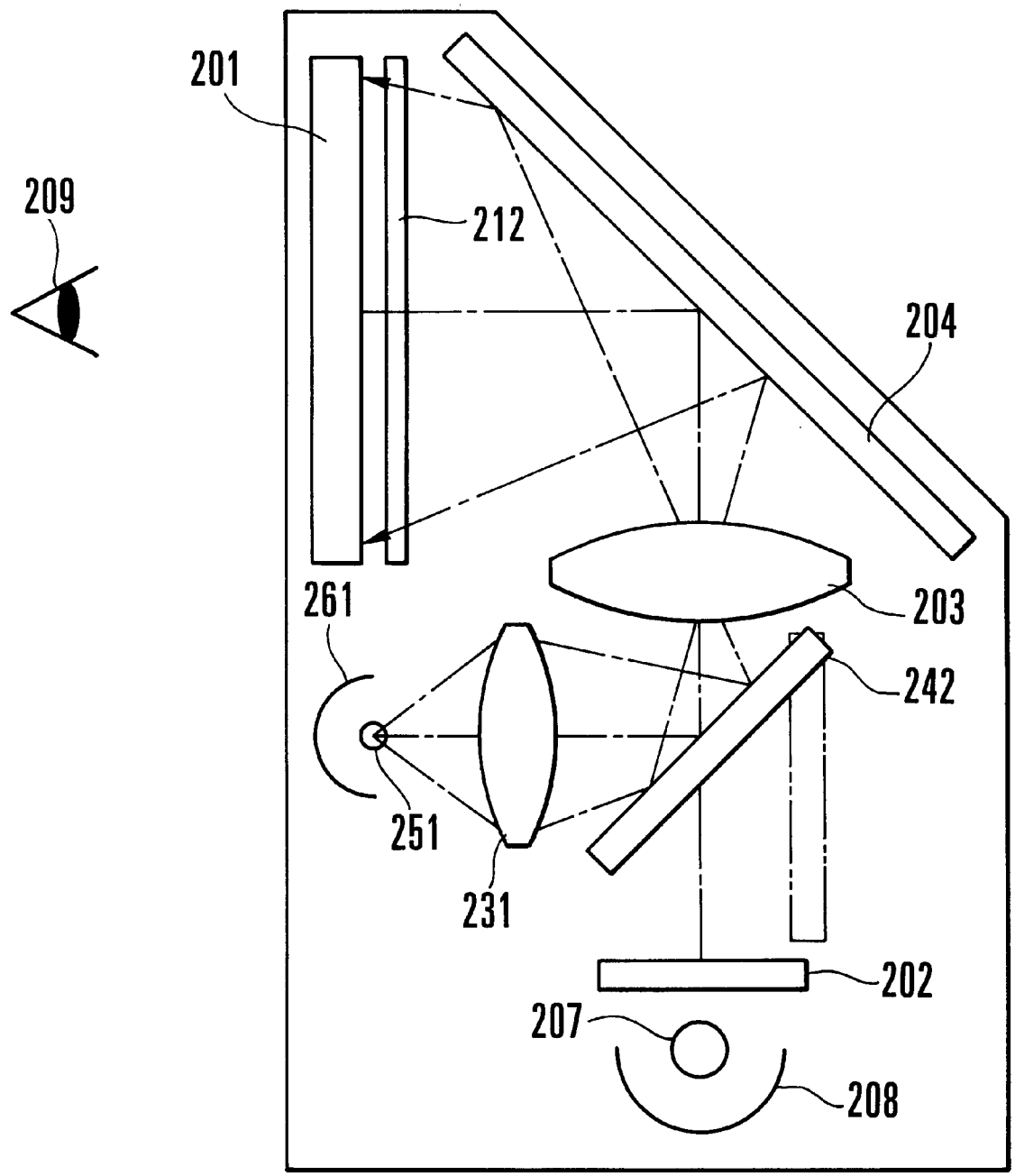
FIG. 23 schematically shows a display device arranged as an eighth embodiment of the invention.

FIG. 23 shows a display device (image display device) arranged as an eighth embodiment of the invention. The eighth embodiment comprises the same component elements as those of the seventh embodiment. These same elements are indicated by the same reference numerals and the details of them are omitted from the following description. The control part of the display device of the eighth embodiment is arranged to operate in about the same manner as the seventh embodiment. The eighth embodiment differs from the seventh embodiment in that a halogen lamp driving circuit (not shown) is arranged in place of the fluorescent lamp driving circuit 2102.

Referring to FIG. 23, in the eighth embodiment, a movable sub-reflection mirror 242 is disposed between the film 202 and the projection lens 203. In front of the sub-reflection mirror 242, there is disposed a reading illumination system composed of a halogen lamp (reading illumination means) 251 which corresponds to the fluorescent lamp 205 in the seventh embodiment, and a combination of a reflection shade 261 and a condenser lens 231 which are arranged to efficiently collect or converge a light emitted by the halogen lamp 251 on the SLM 201. The optical axis of the light of the reading illumination system is arranged to coincide with that of a writing light from the film 202 after the reading illumination light is reflected by the sub-reflection mirror 242.

With the display device according to the eighth embodiment of the invention arranged as described above, when the viewer 209 turns on a frame feeding (returning) button (not shown) for writing an image to be viewed, the CPU 2100 detects the on-state of the frame feeding button through the signal input circuit 2105. The CPU 2100 then sends a signal to the film transport circuit 2103 to cause the film 202 to be moved to a predetermined position.

With the film 202 moved to the predetermined position, the SLM driving circuit 2101 applies a voltage to the SLM 201. The flash light emission circuit 2104 causes the xenon lamp 207 to emit a writing light to illuminate the film 202. A film image formed by the writing light passing through the film 202 is projected on the SLM 201 through the projection lens 203, the reflection mirror 204 and the polymer-dispersion-type liquid crystal element 212. At this time, the sub-reflection mirror 242 is retracted to a position outside of the projection optical system, as shown with a dotted line in FIG. 23. Incidentally, the film 202 and the SLM 201 are arranged to be conjugate to each other with respect to the projection lens 203.

The polymer-dispersion-type liquid crystal element 212 is arranged to be not hindering the writing light from falling on the SLM 201 by being set into a transmissive state with a voltage applied thereto by the driving circuit 2106. With the film image projected on the SLM 201, when the film image is stored in the SLM 201 by the memory action of the ferroelectric liquid crystal layer which constitutes a part of the SLM 201, the application of voltage to the SLM 201 is cut off.

Upon completion of writing the film image into the SLM 201, the CPU 2100 sends a signal to the halogen lamp driving circuit to cause the halogen lamp 251 to light up for making the image recorded on the film 202 viewable by the viewer. At this time, the sub-reflection mirror 242 is located in its position shown with a full line in FIG. 23. Therefore, the SLM 201 is transmissively illuminated with the reading light coming from the halogen lamp 251 through the condenser lens 231, the sub-reflection mirror 242, the projection lens 203, the reflection mirror 204 and the polymer-dispersion-type liquid crystal element 212.

The condenser lens 231 is arranged to make the halogen lamp 251 and the pupil of the projection lens 203 to be conjugate to each other, so that the reading light emitted from the halogen lamp 251 can efficiently fall on the pupil of the projection lens 203. Further, the pupil of the condenser lens 231 is arranged to be in a position conjugate to the polymer-dispersion-type liquid crystal element 212 with respect to the projection lens 203.

In illuminating the SLM 201 with the reading light, the polymer-dispersion-type liquid crystal element 212 is set in a diffused state by canceling a voltage applied thereto. As a result, the pupil image of the condenser lens 231 obtained by the reading light is diffused through the polymer-dispersion-type liquid crystal element 212 to uniformly illuminate the SLM 201 in a light transmissive manner. Therefore, the display image is viewable in a uniformly illuminated state.

In the case of the eighth embodiment, the reading illumination system which is composed of the halogen lamp 251, the reflection shade 261 and the condenser lens 231 is arranged near to the projection lens 203. Therefore, compared with a case where a reading illumination system is arranged between the SLM 201 and the reflection mirror 204, the eighth embodiment permits the SLM 201 and the reflection mirror 204 to be arranged closer to each other, so that the display device can be more compactly arranged by shortening the length of the optical path of a writing light projecting optical system.

(Ninth Embodiment)

Figure 24:
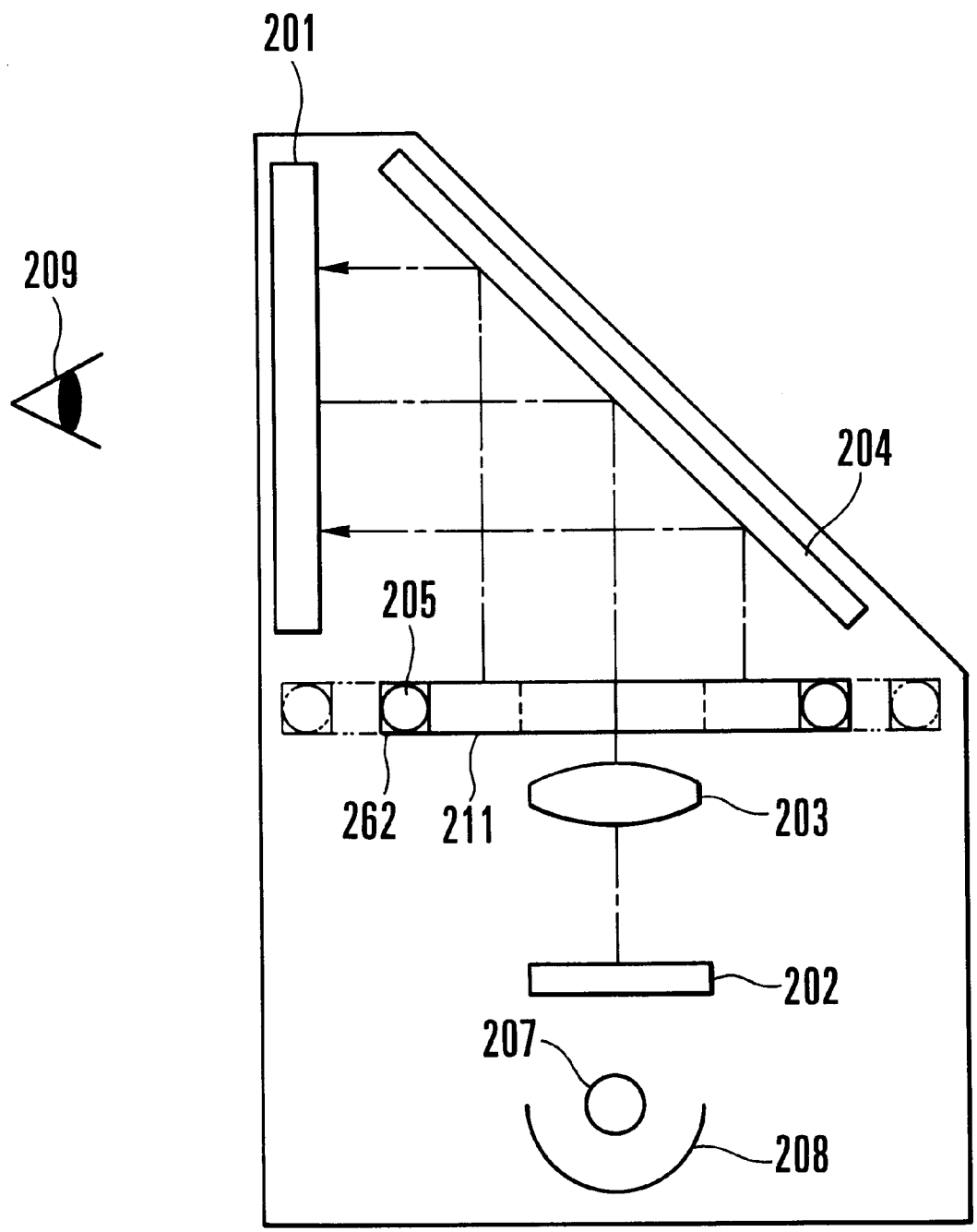
FIG. 24 schematically shows a display device arranged as a ninth embodiment of the invention.

FIG. 24 shows a display device (image display device) arranged as a ninth embodiment of the invention. The ninth embodiment comprises the same component elements as those of the seventh embodiment. These same elements are indicated by the same reference numerals and details of them are omitted from the following description. The control part of the display device of the ninth embodiment is arranged to operate in about the same manner as the seventh embodiment.

The ninth embodiment differs from the seventh embodiment in the following point. In the case of the ninth embodiment, two illumination units, each composed of a fluorescent lamp 205, a reflection shade 262 and a light conducting member 211, are arranged between the projection lens 203 and the reflection mirror 204. The two illumination units are symmetrically arranged with respect to the center of optical axis of a writing light which comes to the reflection mirror 204 through the projection lens 203.

Referring to FIG. 24, with the display device according to the ninth embodiment arranged in the above manner, when the viewer 209 turns on a frame feeding/returning button (not shown) for writing an image to be viewed, the CPU 2100 detects the operated state of the button through the signal input circuit 2105. The CPU 2100 then sends a signal to the film transport circuit 2103 to cause the film 202 to be moved to a predetermined position.

When the film 202 reaches the predetermined position, the SLM driving circuit 2101 applies a voltage to the SLM 201. The flash light emission circuit 2104 causes the xenon lamp 207 to emit light for illuminating the film 202. As a result, a film image is formed with the writing light passing through the film 202. The film image is projected on the SLM 201 through the projection lens 203 and the reflection mirror 204. At this time, each of the two illumination units is retracted to a position outside of the optical path of the projection optical system, as shown by a dotted line in FIG. 24. Incidentally, the film 202 and the SLM 201 are conjugate to each other with respect to the projection lens 203. With the film image thus projected on the SLM 201, the film image is stored by the memory action of the ferroelectric liquid crystal which constitutes a part of the SLM 201. Upon completion of the image storing action, the application of voltage to the SLM 201 is cut off to terminate the film image writing action.

Upon completion of the film image writing action on the SLM 201, the CPU 2100 sends a signal to the fluorescent lamp driving circuit 2102 to cause each of the fluorescent lamps 205 to light up. At that time, the two illumination units are located in positions which are indicated by full lines in FIG. 24. The reading light emitted from the fluorescent lamps 205 is diffused by the light conducting members 211 which serve as a light diffusing means. The SLM 201 is thus transmissively illuminated with the reading light through the reflection mirror 204. The reading light which exits from the light conducting members 211 is uniform within the plane thereof. Besides, the reading light is reflected by the reflection mirror 204 before the SLM 201 is transmissively illuminated with the light. The arrangement thus enables the viewer 209 to view a high quality display of the film image in a uniformly illuminated state.

In the ninth embodiment, the illumination units which emit the reading light are arranged near to the projection lens 203. Therefore, the ninth embodiment permits the SLM 201 and the reflection mirror 204 to be arranged close to each other, so that the display device can be compactly arranged by shortening the length of the optical path of the projecting optical system.

In each of the embodiments disclosed, a liquid crystal type spatial light modulator is employed as a storing display means for the image display device. The invention is, however, applicable to an image display device wherein a spatial light modulator of a type other than the liquid crystal type, such as a spatial light modulator using BSO (bismuth silicon oxide) is used as the storing display means or wherein a storing display means of some other kind is used.

Each of the embodiments disclosed is arranged to display an image recorded on a photographic film. The invention is, however, applicable to a case where an object of viewing is an image recorded on a transmissive original other than a photographic film.

According to the arrangement of each of the embodiments disclosed, the reading illumination means can be arranged together with a projection lens, etc., in a position closer to the original than the reflecting means included in the projection optical system. Therefore, compared with the conventional arrangement wherein the reading illumination means is disposed between a storing display means and a reflecting means, the image display device according to the invention can be more compactly arranged.

Besides, according to the invention, the storing display means is not directly illuminated by the reading illumination means but is illuminated after the reading illumination light is reflected by a reflection means which is intrinsically arranged to reflect a writing light. This arrangement permits uniform illumination of the storing display means and enhancement of quality of a display image without arranging any additional reflection means for the reading light.

The provision of the light diffusing means for bringing the reading light from the reading illumination means into a diffused state, before the storing display means is illuminated with the light, according to the invention also further enhances the uniformity of the illumination of the storing display means.

Further, the use of the straight-tube-type lamp having about the same length as the lateral dimension of the image storing surface of the storing display means for the reading illumination means, according to the invention, ensures that the whole surface of the image storing part can be uniformly illuminated for improvement in quality of an image on display.

We claim:

1. A display device comprising:
    a spatial light modulator capable of writing therein an image and capable of reading therefrom the written image by converting the image; and
    an illumination device which transmissively illuminates said spatial light modulator through respective different paths for writing the image and for reading the image; said illumination device including a first illumination element for writing the image and a second illumination element for reading the image, and said second illumination element being located outside a writing optical path of an enlarged optical system formed by the first illumination element.

2. A display device according to claim 1, wherein illumination light emitted from said first illumination element is guided to said spatial light modulator after being reflected by a reflection surface to transmissively illuminate said spatial light modulator, and illumination light emitted from said second illumination element is guided directly to said spatial light modulator to transmissively illuminate said spatial light modulator.

3. A display device according to claim 1, wherein said spatial light modulator has an image storing function.

4. A display device according to claim 3, wherein said spatial light modulator includes a ferroelectric liquid crystal layer which is in contact with a photoconductor layer.

5. A display device according to claim 3, further comprising a switch device for switching said spatial light modulator between a state of permitting an image to be stored therein and a state of holding the stored image therein.

6. A display device according to claim 1, wherein a developed film is set within said display device, and an image recorded on said film is written in said spatial light modulator.

7. A display device according to claim 5, wherein a developed film is set within said display device, and an image recorded on said film is written in said spatial light modulator.

8. A display device according to claim 3, wherein said spatial light modulator is provided with color separating means disposed on a writing side thereof for separating a white light into different colors, and the image is colored through said color separating means both in writing the image and in reading the image.

9. A display device according to claim 4, wherein said spatial light modulator is provided with color separating means disposed on a writing side thereof for separating a white light into different colors, and the image is colored through said color separating means both in writing the image and in reading the image.

10. A display device according to claim 5, wherein resetting of the image written in said spatial light modulator is effected by said illumination device.

11. A display device according to claim 1, further comprising reflection means for reflecting a writing light from said illumination device to guide the writing light to said spatial light modulator, said reflection means being provided with an odd number of reflection surfaces for inverting a facing direction of the image to a specific direction.

12. A display device according to claim 11, wherein said odd number of reflection surfaces each have a normal vector which is in parallel with a plane determined by a normal vector of an image recording body and a normal vector of said spatial light modulator.

13. A display device according to claim 12, wherein said image recording body is a developed film, and said odd number of reflection surfaces each invert a facing direction of a film image with respect to an optical axis in respect of one of a longitudinal direction of the film image and a direction of width of the film image.

14. A display device comprising:
- a spatial light modulator capable of writing therein an image and capable of reading therefrom the written image by converting the image;
- a writing device for writing the image for each of second picture elements serially one after another;
- an illumination optical system for imaging light emitted from said writing device to be written in said spatial light modulator; and
- a plurality of reflection means for keeping substantially constant the length of a writing optical path in writing each of the second picture elements in said spatial light modulator.

15. A display device according to claim 14, wherein said illumination optical system includes a semiconductor laser which generates a laser light, a rotary polygonal mirror which reflects the laser light, and a prism which changes a direction of light reflected from said rotary polygonal mirror.

16. A display device according to claim 14, further comprising means for shielding from external light an area where writing of the image in said spatial light modulator is effected by illumination light emitted from said first illumination element.

17. A display device comprising:
- a display element capable of writing therein an image and capable of reading therefrom the written image; and
- a plurality of reading light sources for reading the image from said display element, said plurality of reading light sources being disposed approximately symmetrically with respect to an optical axis of a writing light source for writing the image, light emitted from said plurality of reading light sources and said writing light source being reflected by a reflection member to said display element.

* * * * *